(12) United States Patent
Ouchi et al.

(10) Patent No.: US 6,626,540 B2
(45) Date of Patent: Sep. 30, 2003

(54) IMAGE DISPLAY DEVICE

(75) Inventors: Satoshi Ouchi, Kamakura (JP); Taro Imahase, Fujisawa (JP); Tomohiro Miyoshi, Fujisawa (JP); Fukuyasu Abe, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 51 days.

(21) Appl. No.: 09/810,571

(22) Filed: Mar. 19, 2001

(65) Prior Publication Data

US 2002/0140905 A1 Oct. 3, 2002

(30) Foreign Application Priority Data

Mar. 17, 2000 (JP) ......................................... 2000-081774

(51) Int. Cl.[7] .............................................. G03B 21/14
(52) U.S. Cl. ............................... 353/31; 353/34; 353/37
(58) Field of Search .............................. 353/20, 31, 33, 353/34, 37, 81; 349/5.89

(56) References Cited

U.S. PATENT DOCUMENTS

| | | | | |
|---|---|---|---|---|
| 6,176,586 B1 | * | 1/2001 | Hirose et al. | 349/9 |
| 6,183,091 B1 | * | 2/2001 | Johnson et al. | 349/9 |
| 6,273,567 B1 | * | 8/2001 | Conner et al. | 349/9 |
| 6,304,302 B1 | * | 10/2001 | Huang et al. | 349/9 |
| 6,343,864 B1 | * | 2/2002 | Tajiri | 349/9 |
| 6,375,330 B1 | * | 4/2002 | Mihalakis | 353/31 |

* cited by examiner

*Primary Examiner*—William Dowling
(74) *Attorney, Agent, or Firm*—Antonelli, Terry, Stout & Kraus, LLP

(57) ABSTRACT

A compact, lightweight, low cost image display device with high image quality and improved brightness are attained by a combination of a color separating means and color separating/combining means and color combinations means and two reflecting means and polarizing plate to change the polarization direction of the light and a polarized beam splitter on the optical axis of reflective liquid crystal display element.

13 Claims, 24 Drawing Sheets

IMAGE DISPLAY DEVICE

BACKGROUND OF THE INVENTION

1. Field of the Invention

The present invention relates to a display device for projecting images on a screen using light valve elements such as liquid crystal panels or reflective liquid crystal elements and relates in particular for example, to an image display device for liquid crystal projector devices, reflective image display projector devices, liquid crystal televisions and projection type display devices, etc.

2. Description of the Related Art

Projection type display devices such as liquid crystal projectors are known in the related art as a means to irradiate light from a light source such as an incandescent bulb onto light valve elements such as a liquid crystal display panel for projecting an enlarged image.

In image display devices of this type, light from a light source is changed and adjusted for brightness and darkness on each pixel in the light valve element and projected on a screen, etc. In twisted nematic (TN) type liquid crystal display devices constituting typical liquid crystal display elements, two polarizing plates are each installed at mutually different 90 degree light polarization directions, in the front and rear of the liquid crystal cell formed by injecting liquid crystals between a pair of transparent substrates having a transparent electrode film, and by combining the effect from selecting polarized light constituents of the polarizing plate and rotation of the deflection plane by the electro-optical effect of the liquid crystal, the permeable light intensity of the input light is controlled and image information is displayed. In recent years, rapid progress has been made in making these permeable or reflective image display elements themselves more compact and improving performance such as resolution.

The advancements in making display devices using light valve elements such as image display elements more compact and having high performance had led not just simply to making image displays with video signals as in the related art, but proposal of technology for projector type image display devices constituted by image output device for personal computers. Demands here stress compactness and obtaining a bright image extending to all corners of the screen. However, projector type image display devices of the related art have the drawbacks of being large and that the image brightness ultimately obtained and performance characteristics such as image quality are inadequate.

For example when making the overall liquid crystal display device more compact, an effective method is to make the light valve elements or in other words, the liquid crystal display elements themselves smaller. However, when the liquid crystal display elements are made smaller, the surface area irradiated by the liquid crystal means becomes smaller. Consequently, the surface area struck by the lighting means for the total luminous flux intensity emitted by the light source become smaller so the problem occurs that the percentage of luminous flux intensity (hereafter light utilization efficiency) on the liquid crystal element was low to the total luminous flux intensity emitted by the light source. Another problem is that the sides of the screen are dark. Further, the liquid crystal display element can only utilize the polarized light in one direction so that only approximately half of the random polarized light emitted from the light source is utilized. Technology for an optical system to beam random polarized light from a light source on a liquid crystal display element aligned in a one-way polarization direction, is disclosed in Japanese Patent Laid-Open No. H4-63318 wherein a polarity converter element such as a polarized beam splitter is utilized and random polarized light beamed from a light source is separated into P polarized light and S polarized light and combined together using a prism.

The optical system of the related art utilizing the above arrangement, and particularly a lighting system utilizing a reflective liquid crystal display device was configured so that the polarized beam splitter and reflective liquid crystal display element were combined and the light polarization direction converted and checked according to the expressed tones and the on/off of the video, and the video later projected onto a screen by a projecting lens.

Due to the polarized beam splitter, the above configuration had the problems that irregularities occurred in the color and the contrast was low.

In other words, changes occurred in the permeance rate of the P polarized light to the angle of the input light beam and the reflection rate of the S polarized light so that irregularities occurred in the reflection rate and permeance rate of the polarized beam splitter to the specified angle of the lighting system. These irregularities caused deterioration in the quality of the image quality projected on the screen.

The polarized beam splitter such as disclosed in Japanese Patent Laid-Open No. 09-054213 with the permeant material enclosing the PB film was comprised of glass material with an optical resilience coefficient having an absolute value within $1.5 \times 10^{-8}$ cm2/N, so that the birefringence (double refraction) was low and the contrast on the screen was improved.

However, in this example of the related art, the weight of the polarized beam splitter glass material itself was heavy (more than twice the conventional weight), the utilization level was preferably low since the cost was high. However, in typical optical systems other than the embodiment of this invention, three R G B reflective panels were used and each required a polarized beam splitter so that no consideration was given to reducing the size, the weight or the cost of the optical system.

Also, in optical systems utilizing reflective liquid crystal display elements, the dichroic mirrors or dichroic prisms made with a dichroic coating and utilized for color separation or combination, changed the direction of the light by means of polarizing the direction of the light when beaming light in a system for color separation and combination. The characteristics are known to change due to the polarization direction of light beamed onto the dichroic coating. In other words, a difference in light wavelength bands occurs in light separated into P polarized light and S polarized light. More specifically, on a dichroic blue reflective surface, the half wavelength of a P polarized light input beam is lower than an S polarized light input beam. In such a case, the beam input with S polarized light is separated into permeable light and reflected light according to the S polarized light half wavelength λs by the blue reflective coating surface. When the image information is white, the light is converted into P polarized light by the blue reflective liquid crystal display element, and the light beam input again onto the blue reflective coating surface. This time the beam input with P polarized light is separated into permeable light and reflected light according to the polarized light half wavelength λp. In this case, the half-wavelength portion that has fallen low is not reflected back and is a permeable part of the wavelength band. The light on the permeating part of the wavelength band cannot be utilized in the image display device so the light half-wavelength differential is lost and the brightness diminishes and color performance deteriorates. The same effects occur on the red reflective surface.

Therefore the light that deviates from this wavelength band cannot be utilized. The problem of lowering of the light utilization efficiency and a deteriorated color performance therefore occur in the image display device.

Contrast is an important performance characteristics in image display devices, and inserting a polarizing plate between both or either of the polarized beam splitter and lighting system, and polarized beam splitter and projection lens is effective in improving contrast. However, in the related art, all the red, blue and green light permeates through the polarizing plate creating the problem of a rise in temperature in the polarizing plate, a drop in contrast, and burns on the polarizing plate.

Therefore, as can be seen from the above description, measures must be taken to reduce the size of the optical system and projection image display system itself as well as reduce weight and reduce costs while maintaining the image quality and the brightness of the image display device.

SUMMARY OF THE INVENTION

Methods to reduce the size and weight of the device itself, and lower the cost while maintaining the brightness and image quality performance of the image display device are therefore a problem in the above described technology of the related art. In other words, the optical efficiency of the dichroic prism constituting the color separating/combining means and the polarized beam splitter must be improved, and a method for inputting and outputting light to a reflective panel contrived and respective effective placement contrived in order to improve the image contrast and brightness, reduce the size of the device itself, reduce the weight and lower the cost.

In view of the above problems with the related art, it is an object of the invention to provide image display technology that is compact and inexpensive while maintaining brightness and high image quality.

In order to achieve the above objects, an optical unit of an image display device of this invention is comprised of a reflective image display element for forming an optical image according to a video signal from the light beam output from the light source, and a lighting system to beam the light onto the reflective image display element and synthesize the light reflected from the reflective image display element, wherein the image display device is further comprised of a color separating means to separate the input light into a plurality of light beams, and a color combining means and the color separating means are installed along the optical axis of the light separated from the color separating means.

DETAILED DESCRIPTION OF THE PREFERRED EMBODIMENTS

The embodiments of the invention are hereafter described while referring to the accompanying drawings.

Figure 1:
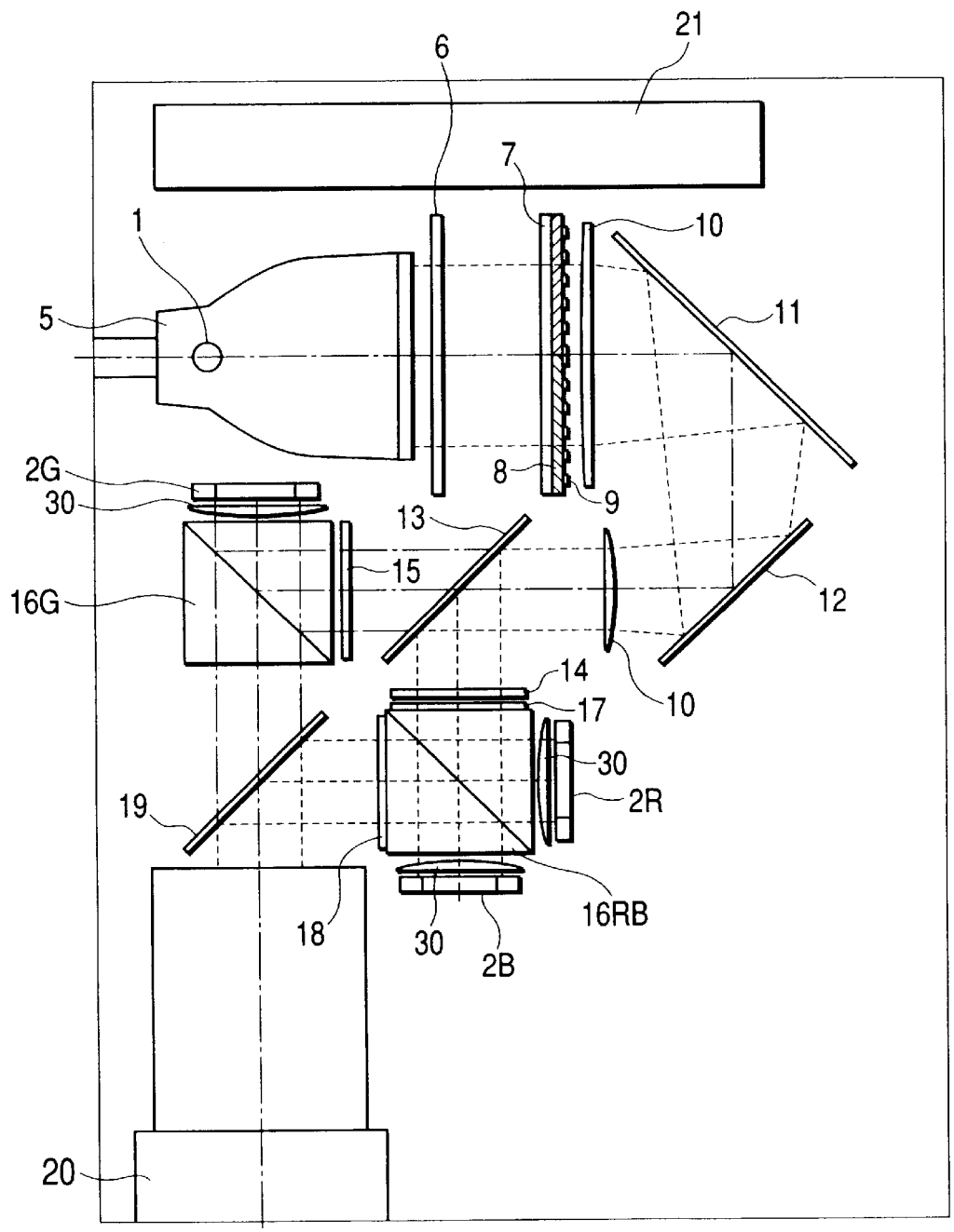
FIG. 1 is an overall plan view showing a first embodiment of a projection type liquid crystal image display device of the invention.

An overall plan view showing the first embodiment of the projection is shown in FIG. 1. The embodiment in FIG. 1 shows three plate type projection display devices utilizing a total of three plates for the three primary colors R (red), G (green) and B (blue) constituted by reflective liquid crystal elements 2 as the liquid crystal light valves.

The projection display device in FIG. 1 contains a light source 1. The light source 1 is a white color lamp such as an ultra high voltage mercury lamp, metal halide lamp, xenon lamp, mercury xenon lamp or halogen lamp, etc. The light source 1 contains at least one reflective mirror 5 having a circular or polygonal output beam aperture and the light output from the light source 1 passes through the reflective liquid crystal elements 2 constituting the liquid crystal light valves, progresses to the projection lens 3 and is projected onto the screen 4.

The light emitted from the lamp of the light source 1 is condensed by a reflector 5 having an elliptical surface, or a radial surface or a non-spherical surface, and input to a first array lens 6 comprised by a plurality of condensing lenses installed in the output beam aperture of this reflective mirror 5 and rectangular frame of equivalent size, and the light beamed from the lamp unit is concentrated to form a plurality of secondary light source images on the first array lens 6. The light passes through a second array lens 7 comprised by a plurality of condensing lenses installed in the vicinity of the plurality of above mentioned secondary light source images and further forming images of the lens images of first array lens 6 on a liquid crystal display element 2. The emitted light beam is input to a row of diamond-shaped prisms of about half the size of each lens width installed for an appropriate pitch laterally along the optical axis of each lens of the second array lens 7. A polarized beam splitter 8 film has been coated on the surface of these prisms and the input light is separated into P polarized light and S polarized light by the polarized beam splitter 8. The P polarized light proceeds directly through the interior of the polarized beam splitter 8 and is rotated 90 degrees and deflected by the $\lambda/2$ wavelength polarizing plate 9 installed on the output beam surface of the prism, converted into S polarized light and output. The S polarized light on the other hand, is reflected by the polarized beam splitter 8, and after being reflected once more along the basic direction of the optical axis within the adjoining diamond-shaped prism, is output as S polarized light. The emitted light is input to a collimator lens 10.

In the projection type image display device using the reflective liquid crystal display elements of the related art, the polarized light is reflected in only one direction due to the combination of input light polarizing plate and reflective liquid crystal display elements, so that only about half the reflected light amount is obtained. However, by using the polarized beam splitter 8, a projection liquid crystal display device 2 having twice the brightness of the related art can theoretically be obtained by aligning along the direction of the random polarized light emitted from the light source 1 and inputting the light on the liquid crystal display element 2. Further, uniform quality can be obtained by overlapping the individual images of each lens cell of the array lens 6 on the liquid crystal display element 2.

The collimator lens 10 is comprised of at least one or more lenses, has a positive refractive potential, and has the effect of further concentrating the S polarized light. The light passing through this collimator lens 10 is deflected a specified 90 degrees by the optical axis direction of the reflective mirrors 11 and 12. The light then passes through a condenser lens 30 and beams onto (irradiates onto) the three RGB reflective liquid crystal display elements 2R, 2G, 2B so that light is separated into two portions, one of G (green) light and the other R, B (red and blue) light by the color separating prisms (not show in the drawing) or the color separating mirror 13, and input to the respective exclusive color polarized light separating/combining elements constituted by the polarized beam splitters 16G and 16RB. In other words, the G light is input to the G exclusive polarized beam splitter 16G of this invention, and is then an S polarized light, so is reflected to the reflective liquid crystal display element 2G and illuminates the panel. Further, the B light and R light passes the B-R exclusive polarizing plate 14, is input to the B-R exclusive beam splitter 16RB of this invention. Either the B light or the R light then passing through the designated wavelength converter element 17 that converts light only of that designated wavelength, is converted from S polarized light to P polarized light. The B light as P polarized light converted from polarized light for example, passes through the R-B exclusive beam splitter 16RB and illuminates the B exclusive reflective liquid crystal display element 2B. The R light on the other hand, is S polarized light so after being reflected by the R-B exclusive beam splitter 16RB is illuminated on the reflective liquid crystal display element 2B. The above description is of course only one example and the invention is not limited by this example. A configuration may be utilized wherein the R light is for example converted into P polarized light, or the original polarized light of the illuminating system may be P polarized light, and one of the RGB colors may be converted into S polarized light, and the remaining two colors constitute P polarized light. A R-B exclusive input polarizing plate 14 and a G exclusive polarizing plate 15 are installed on the light incident side of the reflective liquid crystal display elements 2R, 2G, 2B for each color, the polarization intensity of each color enhanced, a polarizing plate 14 stuck to the glass and the color purity enhanced by coating a Color alignment film on the reflecting side. Then, the polarized light is exclusively converted by the reflective liquid crystal display elements 2 for each color, and the light then input again to the exclusive beam splitters 16G, 16RB, the S polarized light reflected and the P polarized light permeates through.

A plurality of reflective liquid crystal display elements 2 are formed to correspond to the number of display pixels (for example, 1024 horizontal pixels and 768 vertical pixels for each of the three colors, etc.). The light polarization angle of the pixels matching the liquid crystal display elements 2 changes according to an external drive signal, and ultimately a light is output in the polarization direction of the input beam and an intersecting direction, and light matching the polarized light direction is analyzed by the polarized beam splitter 2. The light intensity passing through the polarized beam splitter and the analyzed light intensity are determined for light along the deflection light angle, by its relation with the polarization angle of the polarized beam splitter 2. The image is in this way projected according to an externally input signal. At this time, the polarization direction is the same as the input light in the polarized light converter element constituted by the B exclusive beam splitter 16G and the R-B exclusive beam splitter 16RB of this invention, when a black display is shown on the reflective liquid crystal display elements 2R, 2G, 2B, and the light returns as is, along the light input path, to the light source side. However, the degree of deflection and extinction rate of the polarized beam splitter that constitute the light analyzing efficiency exert a minute effect on performance, and a slight leakage or disturbance in the polarized light passes through the polarized beam splitter, passes through the color combining mirror 19 or the color combining prism and illuminates onto the projection lens 20 and appears as a minute amount of brightness on the screen during a dark display. A decline in the contrast performance therefore occurs.

Of course the dielectric multilayer film forming the polarized light converter element and color separation/combining prism is applied to allow only a designated light wavelength from the input light through, in order to obtain a peak value of the permeance rate or reflection rate of that P polarized light or the permeance rate or reflection rate of that S polarized light, or permeance rate or reflection rate for a circular polarized light. The dielectric multilayer film allows only a limited light wavelength through, for example, a G exclusive beam splitter is coated with a dielectric multilayer film ideal for G light exclusively for a wavelength band in the vicinity from 500 nm to 600 nm, and utilizing an R-B exclusive polarized beam splitter 16 RB coated with a dielectric multilayer film ideal for R light and B light exclusively for the two wavelength bands in the vicinity from 400 nm to 500 nm and from the vicinity of 600 nm to 700 nm means that a dielectric multilayer film can easily be formed, and also that the permeance rate and reflective rate and further the (light) analyzing efficiency are improved compared to the related art. A reflective liquid crystal display device for high accuracy color restoration and high luminance, and high efficiency contrast can therefore be provided. By also adding an inclined (sloping) film or in other words a dielectric multilayer film whose film thickness changes according to the input angle of the light, an image of higher uniformity and high color purity can be obtained.

The light emitted from the exclusive polarized beam splitter 16 RB is converted to one-way R light or B light by the designated wavelength converter element 18, and both the R light and B light converted to S polarized light are input to the dichroic mirror 19.

The RGB light constituting the image is afterwards recombined by a color combining mirror such as the dichroic mirror 19 or a dichroic prism not shown in the drawing, and the light passed through a projection means 20 (for example a projection lens) such as a zoom lens and then arrives on the screen. The image formed by the reflective liquid crystal display elements 2R, 2G, 2B is shown as an enlarged projection image on the screen by the projection means 20. The reflective liquid crystal display device utilizing these three reflective liquid crystal display elements drives the lamp and the panel by means of a power supply 21.

The reflective liquid crystal display of the related art separates the light from the light source into the three colors R G B with at least one or more color separator prisms or color separator mirrors, analyzes each of the R G B light with at least three or more polarized beam splitters and after combining the three colors with the color combining prisms further projects the image on the screen using the projection lens so that the device was large overall, had a heavy weight and tended to have a high cost. This invention along with achieving a compact and light-weight device by means of a structure utilizing two units constituted by a G exclusive and a R-B exclusive polarized beam splitter, allows freely controlling the color purity, improves color irregularities and simultaneously improves performance. A projection type image display device, compact and with high brightness and high image quality can therefore be provided. Further, a cost reduction can be achieved because the number of component parts is reduced.

Figure 2:
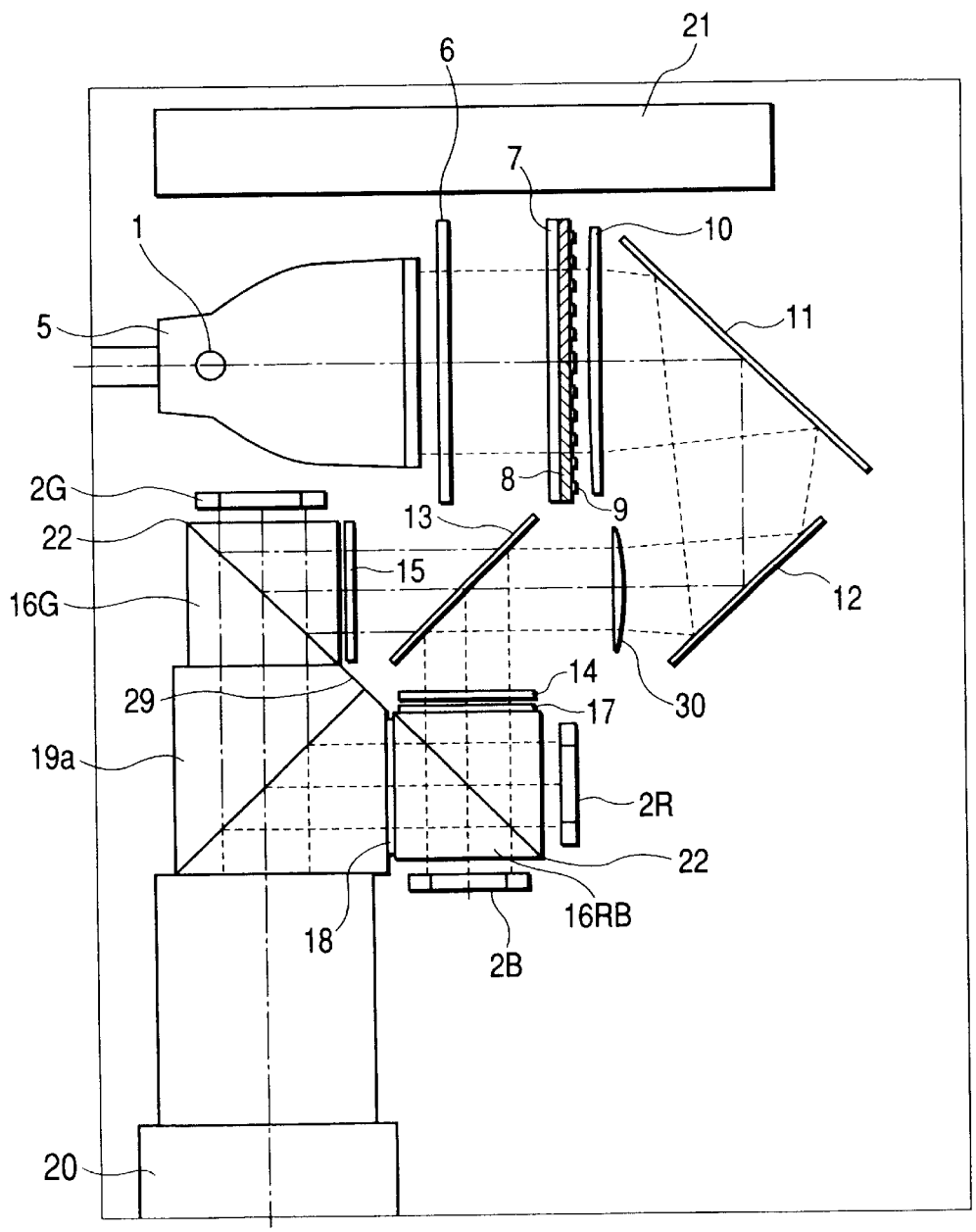
FIG. 2 is an overall plan view showing a second embodiment of the projection type liquid crystal image display device of the invention.

FIG. 2 is an overall plan view showing the second embodiment of the projection type liquid crystal image display device of the invention.

The R G B color light emitted from reflective liquid crystal display elements such as the reflective liquid crystal display elements 2R, 2G, 2B, or reflective intense inductive image display elements or drive micromirror image display elements, is analyzed by the polarized beams splitter 16G and polarized beam splitter 16RB that constitute the color separating/combination elements, and the color is then recombined by the dichroic prisms 19a and the light passes through a projection means 20 such as a zoom lens and arrives on the screen. The image formed on the reflective liquid crystal display elements 2R, 2G, 2B by the projection means 20 is projected as an enlarged image on the screen. The prism 19a of this invention has a size larger than the polarized beam splitter so that the light beam is not eclipsed, and the overall structure is compact so that the size is different to the beam splitter. The sloping (or inclining) film with the dichroic coating can be freely set so that an image with a high uniform color purity can be provided. Also in the structure of the invention, a support section is installed for an angle bevel 29 in the cabinet holding optical elements such as a dichroic prism 19a, by supporting the angle bevel 29 for the optical elements, the positioning and maintaining of the optical element such as the dichroic prism 19a is easily accomplished, assembly time is shortened during production, and the overall cost of the projection type display device can be reduced. The space savings achieved by this angle bevel 29 allow installing optical members for example a lens or other optical elements, to avoid the trouble from high density placement of components and achieve a compact device.

Figure 3:
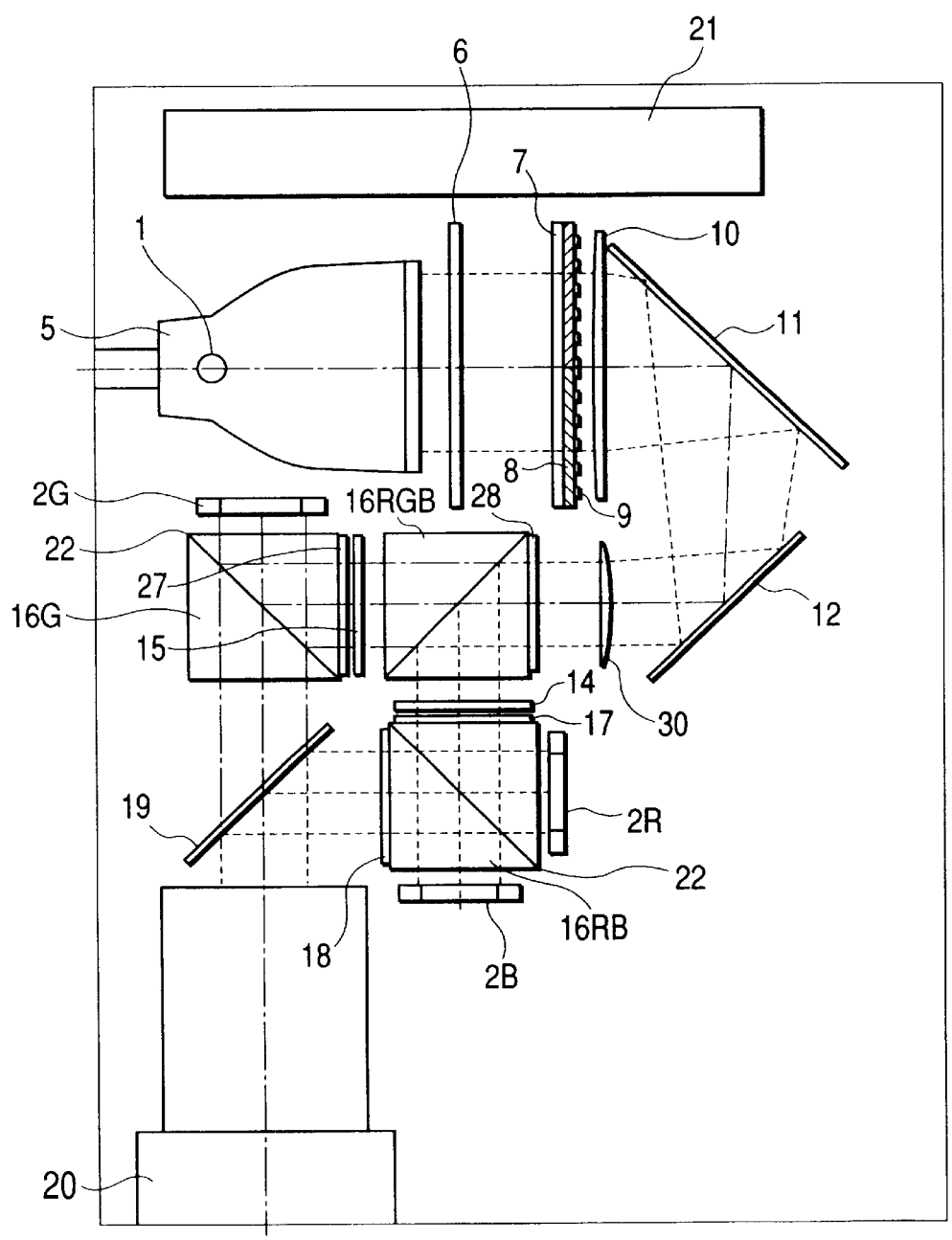
FIG. 3 is an overall plan view showing a third embodiment of the projection type liquid crystal image display device of the invention.

FIG. 3 is an overall plan view showing the third embodiment of the projection type liquid crystal image display device of the invention.

The light passes the condenser lens 30 and in order to illuminate the reflective liquid crystal display elements 2R, 2G, 2B for each R G B color, the light of a designated wavelength band is first converted to a polarization direction by means of a designated wavelength converter element 28. In this case, if the illuminating light is S polarized light then it is converted to P polarized light, and separated into each color by the wideband polarized beam splitter 16 RGB. If for instance G polarized light is converted by the designated wavelength converter element 28, the light is divided into two portions, one G light and the other R, B light by the polarized beam splitter 16 RGB and then input to the respective exclusive polarized color separator/synthesizer element consisting of polarized beam splitters 16G, 16RB. In other words, the P polarized light of the G light is converted into S polarized light by the designated wavelength converter element 27, input to the G exclusive polarized beam splitter 16G, and then reflected back to the G exclusive reflective liquid crystal display element 2G since the light is S polarized light, and beamed onto the liquid display element 2G. Also, the B light and R light passes the B-R exclusive polarizing plate 14, is beamed onto the R-B exclusive beam splitter 16 RB, and then transits the R-B exclusive beam splitter 16 RB to convert only light on the designated wavelength band to the polarization direction, and the polarized light of either the B light or the R light is converted from S polarized light to P polarized light and the B light for example converted to P polarized light, transits the R-B exclusive beam splitter 16 RB and illuminates the B exclusive reflective liquid crystal display element 2B. The R light on the other hand is an S polarized light so after being reflected by the R-B exclusive beam splitter 16 RB is illuminated onto the R exclusive reflective liquid crystal display element 2R.

The above description is of course only one specific example and this invention is not limited to this example. A structure may also be utilized wherein the R light may be converted into P polarized light, the polarized light of a different lighting system may originally be P polarized light, and one color from R G B is converted to S polarized light and the remaining two colors be P polarized light. An RB exclusive input light polarizing plate 14 and a G exclusive input light polarizing plate 15 maybe installed on the incident side for the S polarized light to permeate each of the exclusive color reflective liquid crystal elements 2R, 2G, 2B, and the degree of deflection of each color and color purity enhanced. Afterwards, the polarized light is converted by the reflective image display element 2 for each exclusive color, the light input again to the polarized beam splitters 16G, 15RB for each exclusive color, the S polarized light reflected and the P polarized light permeates through.

A plurality of reflective liquid crystal display elements 2 are formed to correspond to the number of display pixels (for example, 1024 horizontal pixels and 768 vertical pixels for each of the three colors, etc.). The light polarization angle of the pixels matching the liquid crystal display elements 2 changes according to an external drive signal, and ultimately a light is output in the polarization direction of the input beam and an intersecting direction, and light matching the polarized light direction is analyzed by the polarized beam splitter 16. The light intensity passing through the polarized beam splitter and the analyzed light intensity are determined for light along the deflection light angle, by its relation with the polarization angle of the polarized beam splitter 16. The image is in this way projected according to an externally input signal. At this time, the polarization direction is the same as the input light in the polarized light converter elements constituted by the B exclusive beam splitter 16G and the R-B exclusive beam splitter 16RB of this invention, when a black display is shown on the reflective liquid crystal display elements 2R, 2G, 2B, and the light returns as is, along the light input path, to the light source side.

The RGB light constituting the image is afterwards recombined by a color combining mirror such as the dichroic mirror 19 or a dichroic prism not shown in the drawing, and the light passed through a projection means 20 (for example a projection lens) such as a zoom lens and then arrives on the screen. The image formed by the reflective liquid crystal display elements 2R, 2G, 2B is shown as an enlarged projection image on the screen by the projection means 20. The reflective liquid crystal display device utilizing these three reflective liquid crystal display elements drives the lamp and the panel by means of a power supply 21.

The reflective liquid crystal display of the related art separates the light from the light source into the three colors R G B with at least one or more color separator prisms or color separator mirrors, analyzes each of the R G B light with at least three or more polarized beam splitters and after combining the three colors with the color combining prisms further projects the image on the screen using the projection lens so that the device was large overall, had a heavy weight and tended to have a high cost. This invention along with achieving a compact and light-weight device by means of a structure utilizing two units constituted by a G exclusive and a R-B exclusive polarized beam splitter, allows freely controlling the color purity, improves color irregularities and simultaneously improves performance. The color separation mean combines the polarized beam splitter with designated wavelength converter elements so that there are few of the effects accompanying angular dependence and consequently calculating the color performance is easy. A projection type image display device, that is compact and has high brightness and high image quality can therefore be achieved. Further, a cost reduction can be achieved because the number of component parts is reduced.

Figure 4:
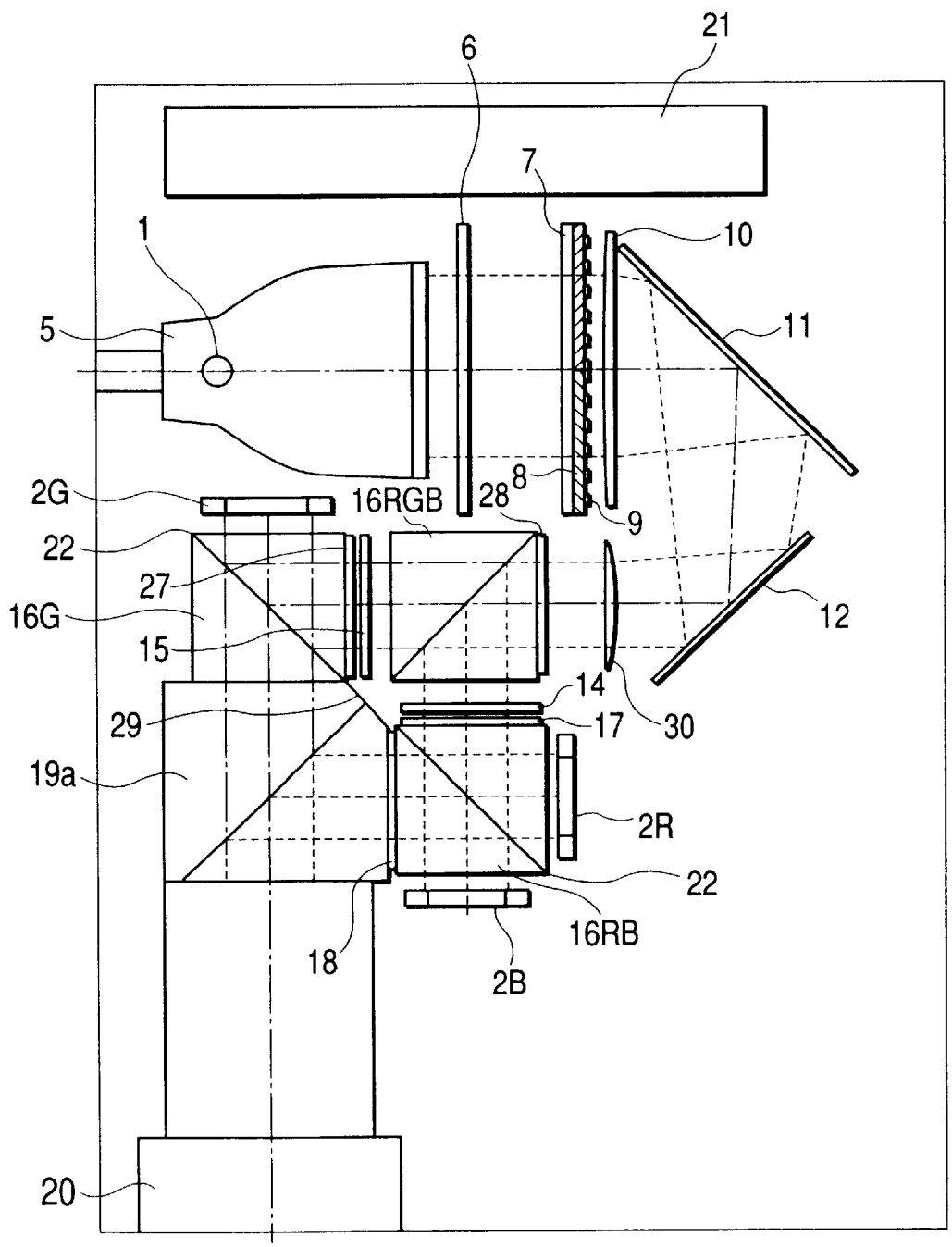
FIG. 4 is an overall plan view showing a fourth embodiment of the projection type liquid crystal image display device of the invention.

FIG. 4 is an overall plan view showing the fourth embodiment of the projection type liquid crystal image display device of the invention.

In addition to the effect of the embodiment of FIG. 3, the R G B color light emitted from the reflective liquid crystal display elements 2R, 2G, 2B is analyzed by the polarized beams splitter 16G and polarized beam splitter 16RB that constitute the color separating/combination elements, and the light for R G B color is then recombined by the dichroic prisms 19a and the light passes through a projection means 20 and arrives on the screen. The image formed on the reflective liquid crystal display elements 2R, 2G, 2B by the projection means 20 is projected as an enlarged image on the screen. The prism 19a of this invention has a size larger than the polarized beam splitter so that the light beam is not eclipsed, and the overall structure is compact so that the size is different to the polarized beam splitter. The sloping (or inclining) film of the dichroic coating can be freely set so that an image with a high uniform color purity can be provided.

Figure 5:
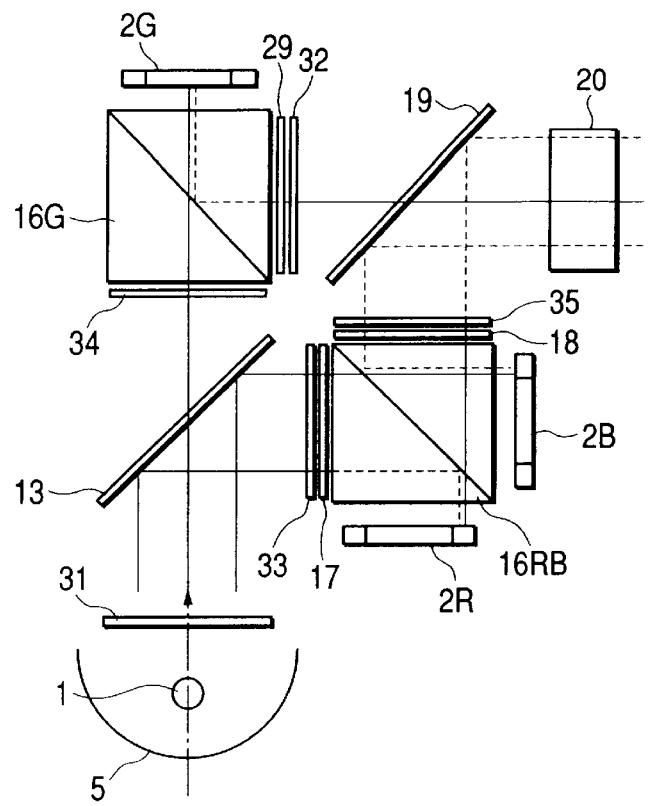
FIG. 5 is an overall plan view showing a fifth embodiment of the projection type liquid crystal image display device of the invention.

Also in the structure of the invention, a support section is installed with a support section for angle bevel 29 in a cabinet holding optical elements such as a dichroic prism 19a. By supporting the angle bevel 29 for the optical elements, the positioning and maintaining of an optical element such as the dichroic prism 19a are easily accomplished, assembly time is shortened during production, and the overall cost of the projection type display device can also be reduced. The space savings achieved by this angle bevel 29 allow installing optical members for example polarized light separating elements constituted by a polarized beam splitter 16 RGB, to avoid the trouble resulting from high density placement of components and achieve a compact device. FIG. 5 is an overall plan view showing the fifth embodiment of the projection type liquid crystal image display device of the invention, and shows in particular the structure of the optical system.

In FIG. 5, a light source unit comprised of a reflector 2 and a light source 1 is installed in the image display device. The light emitted from the light source unit passes through a polarity rectifier element 31 such as a polarizing plate or polarizing beam splitter (PBS), and light rectified as P polarized light is separated into G light (green light) and, R light (red light) and B light (blue light) by the green color separator mirror 13. The separated G light is input to the polarized beam splitter 16B, the input light permeates through as P polarized light, is input to the image display element constituted by reflective liquid crystal display element 2G, the polarized converted light is received and reflected according to the video signal, and input again to the polarized beam splitter 16G. The polarized beam splitter 16G analyzes the input light according to the polarization conversion level received per the reflective liquid crystal display element 2G, or in other words reflects only the S polarization components of the polarized converted light from among the light that was input, and obtains the image.

The R light and the B light separated by the green color separation mirror 13 are input to the polarized beam splitter 16RB only as R light S polarized light. The R light which is S polarized light is reflected by the polarized beam splitter 16RB and input to the reflective liquid crystal display element 2R.

The light input to the reflective liquid crystal display element 2R is received and reflected as polarized light, according to the image signal and input again to the polarized beam splitter 16RB. In the polarized beam splitter 16RB, the light is analyzed according to the polarized light conversion level received by the reflective liquid crystal display element 2R, and an image obtained. The B light permeates the polarized beam splitter 16RB as P polarized light, and is input to the reflective liquid crystal display element 2B. The light input to the reflective liquid crystal display element 2B receives polarity conversion according to the video signal, is reflected and is input again to the polarized beam splitter 16RB. In the polarized beam splitter 16RB, the light is analyzed according to the polarized light conversion level received by the reflective liquid crystal display element 2B, and an image obtained.

Though not shown in the drawing, the S polarized light of just the B light may be polarized-converted by the designated wavelength converter element 17 the converts a designated light wavelength into a polarized direction. The S polarized light of the polarity converted B light is at this time input to the polarized beam splitter 16RB. The B light consisting of S polarized light is reflected by the polarized beam splitter 16RB, and input to the reflective liquid crystal display element 2B. The light input to the reflective liquid crystal display element 2B receives polarity conversion according to the video signal is reflected and is input again to the polarized beam splitter 16RB. In the polarized beam splitter 16RB, the light is analyzed according to the polarized light conversion level received by the reflective liquid crystal display element 2B, and an image obtained. The R light permeates the polarized beam splitter as P polarized light, and is input to the effective liquid crystal display element 2R. The light input to the reflective liquid crystal display element 2R receives polarity conversion according to the video signal is reflected and is input again to the polarized beam splitter 16RB.

In the polarized beam splitter 16RB, the light is analyzed according to the polarized light conversion level received by the reflective liquid crystal display element 2R, and an image obtained.

The respective images of the red, blue and green light that were obtained are combined (synthesized) by a color combining means 19 such as for example a dichroic mirror or a dichroic prism, and projected by means of the projection lens 20. A designated wavelength converter element 18 to convert the polarity direction of a designated wavelength may be inserted on the output side of the polarized beam splitter 16RB at this time, to align the polarity directions of the R light and B light. A polarization screen can also be used at this time setting designated wavelength converter elements 18 to convert the polarity direction of designated wavelengths for all the R light, G light and B light, for aligning their polarity directions.

Alternatively, a polarization converter element 32 can be installed on the optical path of the G light to convert light analyzed by the polarized beam splitter 16G from S polarized light to P polarized light, and input the P polarized light to the color combining means such as a color combining mirror 19. Further, designated wavelength bands can be set with a designated wavelength converter element 18 to polarity-convert light on a designated wavelength so that either or both the R light or B light polarity directions are S polarized light. The permeance band of the G light is in this way widened and either or both of the R light, B light reflection bands are capable of being widened by means of the polarity characteristics of the dichroic mirror or the dichroic coating constituting the color combining means 19.

The polarity rectifier elements 33, 34, 35 such as polarizing plates may be installed on the incident side or the output side of the polarized beam splitter 16G or the polarized beam splitter 16RB. At this time, the polarity rectifier element 33 installed on the incident side of the polarized beam splitter 16RB on the R or B optical path, is installed on the incident side of the optical element 17 for converting the polarization direction of the designated wavelength band. Also, the polarity rectifier element 35 installed on the incident side of the polarized beam splitter 16RB, is installed onto he output side of the designated wavelength converter element 18 for converting the polarization direction of the designated wavelength band.

The structure of this invention utilizing two polarized beam splitters, along with being compact and lightweight, can freely regulate the color purity and improves color irregularities.

Figure 6:
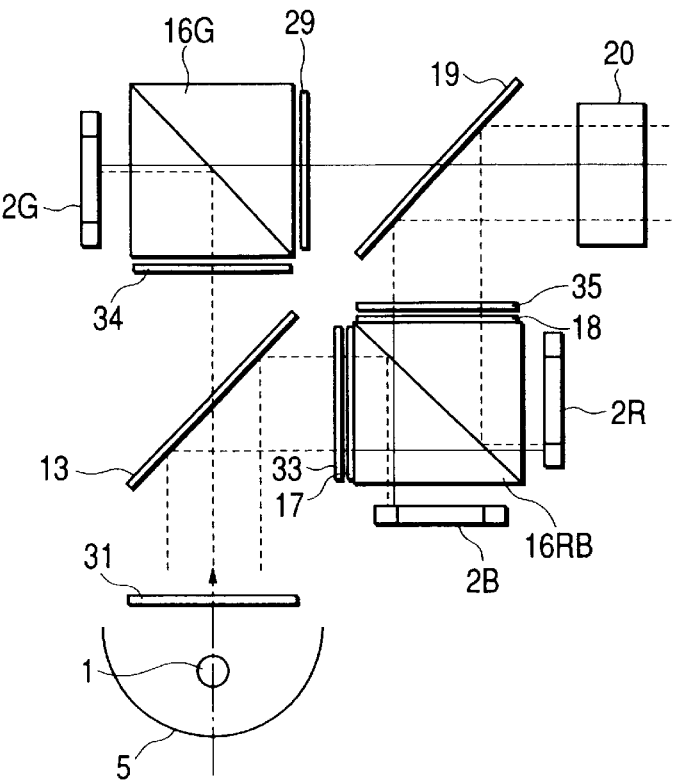
FIG. 6 is an overall plan view showing a sixth embodiment of the projection type liquid crystal image display device of the invention.

FIG. 6 is an overall plan view showing the sixth embodiment of the projection type liquid crystal image display device of the invention, and indicates the structure of the optical system.

In FIG. 6, a light source unit comprised of a reflector 2 and a light source 1 is installed in the image display device, the light source 1 is a white color lamp. The light emitted from the light source unit passes through a polarity rectifier element 8 such as a polarizing plate or a polarization conversion element (polarizing beam splitter), and the light rectified as S polarized light is separated into G light (green light) and, R light (red light) and B light (blue light) by the green color separator mirror 13.

The separated G light is input to the polarized beam splitter 16G, the input light permeating through as S polarized light, is input to the image display element constituted by reflective liquid crystal display element 2G, the polarized converted light is received and reflected according to the video signal, and input again to the polarized beam splitter 16G.

The polarized beam splitter 16G analyzes the input light according to the polarization conversion level received per the reflective liquid crystal display element 2G, or in other words reflects only the P polarization components of the polarized converted light from among the light that was input, and obtains the image.

The R light and the B light separated by the green color separation mirror 13 are input to the polarized beam splitter 16RB only as R light S polarized light by the optical element 17 for converting the polarization direction of the designated wavelength band. The R light which is P polarized light permeates per the polarized beam splitter 16RB and is input to the reflective liquid crystal display element 2R.

The light input to the reflective liquid crystal display element 2R is received and reflected as polarized light, according to the image signal and input again to the polarized beam splitter 16RB. In the polarized beam splitter 16RB, the light is analyzed according to the polarized light conversion level received by the reflective liquid crystal display element 2R, and an image obtained. The B light permeates the polarized beam splitter 16RB as S polarized light, and is input to the reflective liquid crystal display element 2B. The light input to the reflective liquid crystal display element 2B receives polarity conversion according to the video signal, is reflected and is input again to the polarized beam splitter 16RB. In the polarized beam splitter 16RB, the light is analyzed according to the polarized light conversion level received by the reflective liquid crystal display element 2B, and an image obtained.

Though not shown in the drawing, the P polarized light of just the B light may be polarized-converted by the designated wavelength converter element 17 that converts a designated light wavelength into a polarized direction. The P polarized light of the polarity converted B light is at this time input to the polarized beam splitter 16RB. The B light consisting of P polarized light permeates through the polarized beam splitter 16RB, and is input to the reflective liquid crystal display element 2B. The light input to the reflective liquid crystal display element 2B receives polarity conversion according to the video signal is reflected and is input again to the polarized beam splitter 16RB. In the polarized beam splitter 16RB, the light is analyzed according to the polarized light conversion level received by the reflective liquid crystal display element 2B, and an image obtained. The R light permeates the polarized beam splitter as S polarized light, and is input to the reflective liquid crystal display element 2R. The light input to the reflective liquid crystal display element 2R receives polarity conversion according to the video signal is reflected and is input again to the polarized beam splitter 16RB.

In the polarized beam splitter 16RB, the light is analyzed according to the polarized light conversion level received by the reflective liquid crystal display element 2R, and an image obtained.

The respective images of the red, blue and green light that were obtained are combined (synthesized) by a color combining means 19 such as for example a dichroic mirror or a dichroic prism, and projected by means of the projection lens 20. A designated wavelength converter element 18 to convert the polarity direction of a designated wavelength may be inserted on the output side of the polarized beam splitter 16RB at this time, to align the polarity directions of the R light and B light. A polarization screen can also be used at this time setting designated wavelength converter elements 18 to convert the polarity direction of designated wavelengths for all the R light, G light and B light, for aligning their polarity directions.

Alternatively, at this time, designated wavelength bands can be set with a designated wavelength converter element 18 to polarity-convert light on a designated wavelength so that either or both the R light or B light polarity directions on the R light and B light optical paths are S polarized light.

The permeance band of the G light is in this way widened and either or both of the R light, B light reflection bands are capable of being widened by means of the polarization characteristics of the dichroic mirror or the dichroic coating constituting the color combining means 19.

The polarity rectifier elements 33, 34, 35 such as polarizing plates may be installed on the incident side or the output side of the polarized beam splitter 16G or the polarized beam splitter 16RB. At this time, the polarity rectifier element 33 installed on the incident side of the polarized beam splitter 16RB on the R or B optical path, is installed on the incident side of the optical element 17 for converting the polarization direction of the designated wavelength band. Also, the polarity rectifier element 35 installed on the incident side of the polarized beam splitter 16RB on the optical path of the R light and B light, is installed on the light output side of the designated wavelength converter element 18 for converting the polarization direction of the designated wavelength band.

The structure of this invention utilizing two polarized beam splitters, along with being compact and lightweight, can freely regulate the color purity and improves color irregularities.

Figure 7:
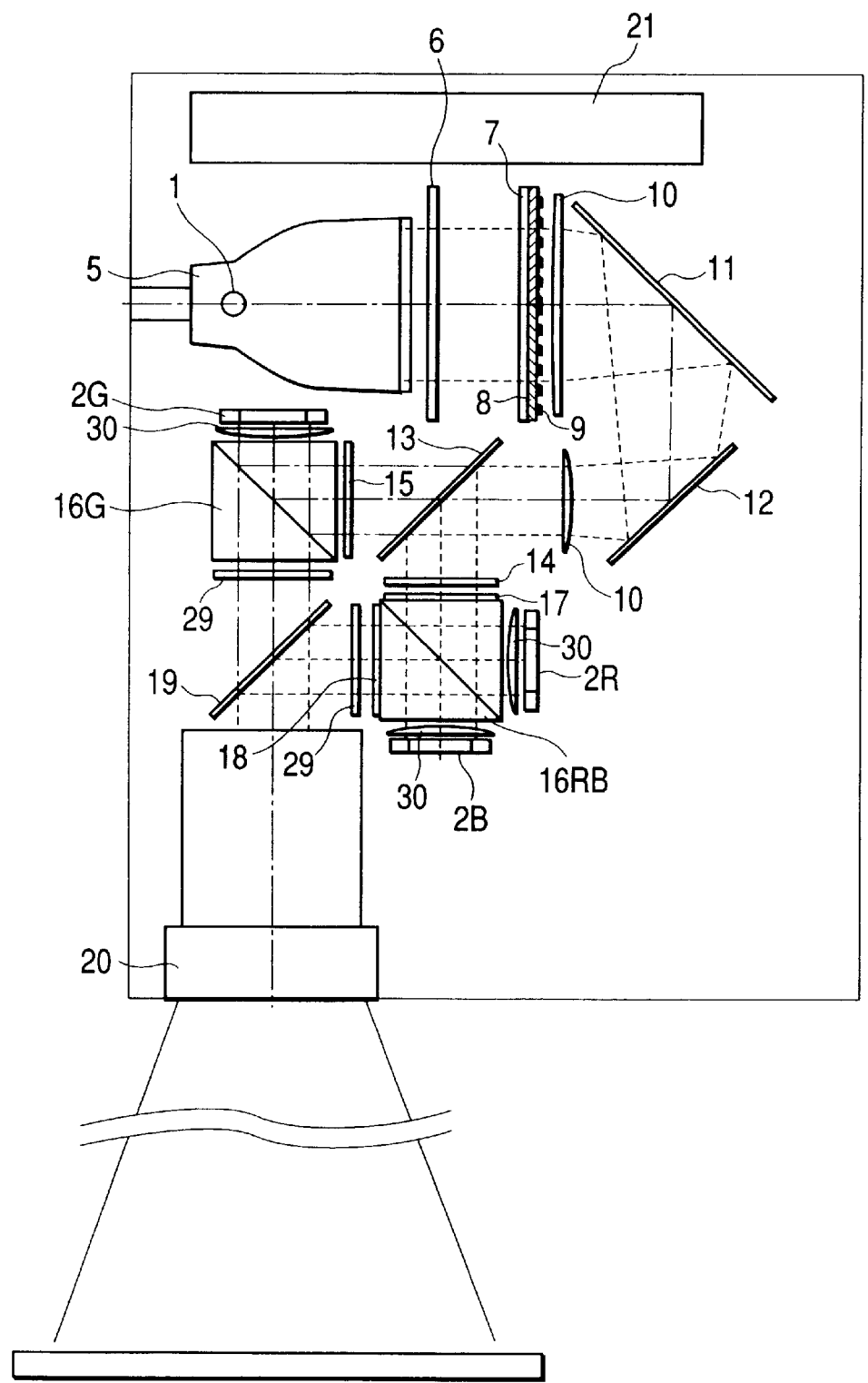
FIG. 7 is an overall plan view showing a seventh embodiment of the projection type liquid crystal image display device of the invention.

FIG. 7 is an overall plan view showing the seventh embodiment of the projection type liquid crystal image display device of the invention.

The embodiment of FIG. 7 shows a three plate type projection display device using a total of three plates corresponding to the three primary colors, R (red), G (green) and B (blue) constituted by the reflective liquid crystal display elements 2R, 2G, 2B as the liquid crystal light valves.

The light source 1 in the projection type liquid crystal display device of FIG. 7 is a white color lamp.

The light emitted from the light source 1 is reflected from at least one reflective surface mirror 5 having an output aperture of a circular or a polygonal shape. The light passes through the reflective liquid crystal display elements 2R, 2G, 2B constituting the liquid crystal light valves, progresses towards the projection lens 20 and is projected on the screen.

A dichroic prism or a dichroic mirror 13 as the color separating means between the polarized beam splitter 8 and the reflective liquid crystal display elements 2, permeates or reflects only the G light from among the three light colors of R light, B light, G light, and the G light is separated from the other B light and G light. The G light separated by the dichroic mirror 13 is permeated or reflected by the polarized beam splitter 16G. The polarizing plates 15, 29 having a polarizing rectifying effect on the G light may be installed on the incident side or the output side of the polarized beam splitter 16G at this time. The light input onto the liquid crystal display element 2G is respectively modulated and readout light, reflected and sent outward, and the modulated light is respectively analyzed by the polarized beam splitter 16 G. The R light and B light separated from the G light, permeate through a designated wavelength converter element 17 for polarization conversion only at a band above or below a specified wavelength from approximately 510 nm to 580 nm, and either or any of the B light or the R light polarized light color is changed, and the polarization directions of the R light and B light intersect each other. The light is then input to the polarized beam splitter 16RB, and separated into R light and B light having different polarization directions, and input into the respective reflective liquid crystal display elements 2R, and 2B. The polarizing plates 14 having a polarizing rectifying effect may be installed on the incident side of the designated wavelength converter element 17. Further, the designated wavelength converter element 18 for polarization-conversion only of the bands above or below the designated wavelength from approximately 510 nm to 580 nm, may be installed on the output side of the polarized beam splitter 28RB. Also, prior to this installation, a polarizing plate 29 having a rectifying effect, may be installed on the output side of the designated wavelength converter element 18.

The light input to the reflective liquid crystal display elements 2R, and 2B is respectively modulated, reflected and sent outward as readout light corresponding to each color per the liquid crystal display element, and the modulated light of each color is respectively analyzed by the polarized beam splitter RB. The analyzed R light and G light and B light are combined by the dichroic prism or the dichroic mirror 19 constituting the color combining filter, the light permeates through the projection means 20 and arrives on the screen 20. By setting the designated wavelength converter element 18 so that the light the optical path permeating the color combination filter is P polarized light, and so that the light on the optical path reflecting from the color combination filter is S polarized light, the permeance and reflectance bands of the color combination filter broaden and a high efficiency optical system can be achieved. The image formed on the liquid crystal element 2 by the projection means 20 is projected on the screen as an enlarged image as a function of a display device. The polarizing plates are installed on the input and the output of the polarized beam splitter so that the contrast is improved.

This invention along with achieving a compact and lightweight device by means of a structure utilizing two polarized beam splitter units, allows freely controlling the color purity, improves color irregularities and simultaneously improves performance. A projection type image display device, compact, with high brightness and high image quality can therefore be provided. Further, a cost reduction can be achieved because the number of component parts is reduced.

Figure 8:
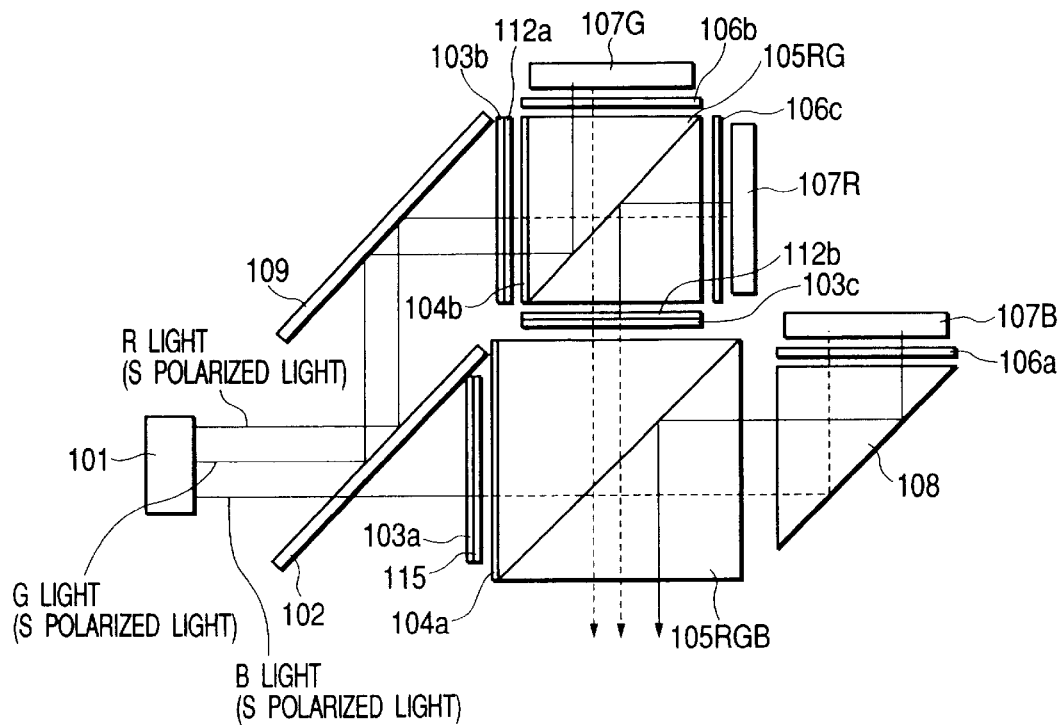
FIG. 8 is an overall plan view showing an eighth embodiment of an optical unit used in an image display device of the invention.

The eighth embodiment of the optical unit of the invention is next described while referring to FIG. 8.

FIG. 8 is an overall plan view showing the eighth embodiment of the optical unit used in the image display device of the invention. The light is shown by solid lines and dotted lines. The solid lines are the S polarized light and the dotted lines are the P polarized light. In the figure, the light from the light source (not shown in the drawing) passes along the polarization converter element 101 typified by a structure combining a ½ wavelength plate and a polarization beam splitter prism, and the P polarized light is converted into S polarized light, and the S polarized light is emitted unchanged as S polarized light.

The polarization converter element 101 may be utilized for converting S polarized light to P polarized light. The example for this embodiment describes the case of converting P polarized light to S polarized light by utilizing the polarization converter element 101.

Of the S polarized light permeating the polarization converter element 101, the B light permeates through a dichroic mirror such as the color separation mirror 102, permeates the polarizing plate 103a and a polarization converter element 115 (polarization designated wavelength converter element may also be used) for a ½ wavelength plate, and a color alignment film 104a, and is input to the polarization beam splitter 105 RGB. The polarizing plate 103a is used for removing the P polarized light mixed in with the S polarized light which is the essential light. The color alignment film 104a is described in detail later on. After the B light consisting of S polarized light is converted from S polarized light to P polarized light in the polarization converter element 115, the B light permeates the polarization beam splitter 105 RGB and is input to the full reflecting prism 108 and is here reflected. The B light in input to the reflecting liquid crystal element 107B by way of the ¼ wavelength plate, and the P polarized light is converted to S polarized light in the reflecting liquid crystal element 107B, and after again being reflected by the full reflecting prism 108 is input to the color combining polarized beam splitter (or dichroic prism) 105 RGB, and here is reflected and output to the projection lens (not shown in the drawing). The ¼ wavelength plate 106a is used mainly for the purpose of aligning the deflecting optical path of the liquid crystal display element 107B, the polarized beam splitter 105RGB, and the lighting system of the polarized optical path.

The R light and the G light constituted by S polarized light reflected by the color separation mirror 102 is reflected by the reflection mirror 109 and after passing through the polarizing plate 103b to remove the S polarized light is input to the designated wavelength converter element 112a. Here, the S polarized R light is converted to P polarized light, and the G light remains as S polarized light and permeates the color alignment film 104b, is input to the color separation/combination polarized beam splitter 105RG.

The S polarized G light is reflected by the polarized beam splitter 105RG, permeates the ¼ wavelength plate 106b and is input to the G light reflective liquid crystal element 107G. The S polarized light is converted to P polarized light in this reflective liquid crystal element 107G, reflected and once again input as P polarized light to the polarized beam splitter 105RG, permeates through the polarized beam splitter 105RG and enters the designated wavelength converter element 112b.

The R light converted to P polarized light permeates through the color separation/combination polarized beam splitter 105RG and after permeating through the ¼ wavelength plate 106c, is input to the R light reflective liquid crystal display element 107R. In this reflective liquid crystal display element 107R, the P polarized light is converted to S polarized light, reflected and output as S polarized light. The S polarized R light is reflected by the polarized beam splitter 105RG and input to the designated wavelength converter element 112b. in the designated wavelength converter element 112b, the S polarized R light is converted to P polarized light and the P polarized G light permeates through unchanged. The P polarized components contained in the P polarized G light and R light are removed by the polarizing plate 103c to prevent deterioration of the contrast, and then are input to the color combining polarized beam splitter (or dichroic prism) 105RGB. The P polarized G light and R light permeates through the color combining polarized beam splitter (or dichroic prism) 105RGB, and the S polarized B light is reflected by the polarized beam splitter (or dichroic prism) 105RGB and input to the projection lens (not shown in drawing). The P polarized components mixed in with the B light permeate through here without being reflected by the polarized beam splitter 105RGB so that the P polarized components are not input to the projection lens.

In the embodiment of FIG. 8, the light input to the color separator mirror 102 is converted to S polarized light but a structure utilizing light converted to P polarized light may also be used.

The S polarized R light is converted into P polarized light by the designated wavelength converter element 112a but a structure converting the G light into P polarized light may also be used.

The color alignment film 104 may for example be a dielectric multilayer film vapor deposited on the direct polarized beam splitter or dichroic prism, and may be a color film or a color filter such as of colored glass wherein a polarized beam splitter or a dichroic mirror is vapor deposited with a dielectric multilayer film on a glass plate or ½ wavelength plate. What is essential is that any suitable material be capable of lowering the permeance rate of the designated wavelength region.

In this embodiment, the full reflecting mirror is not always required and the may be installed facing the output surface of the B light of the color combining polarized beam splitter 105 RGB.

However, since the height of the optical path R, G, B light can be aligned by installing the full reflecting prism such as in this embodiment, the efficiency of each light color is good, and a satisfactory contract can be obtained.

Figure 9:
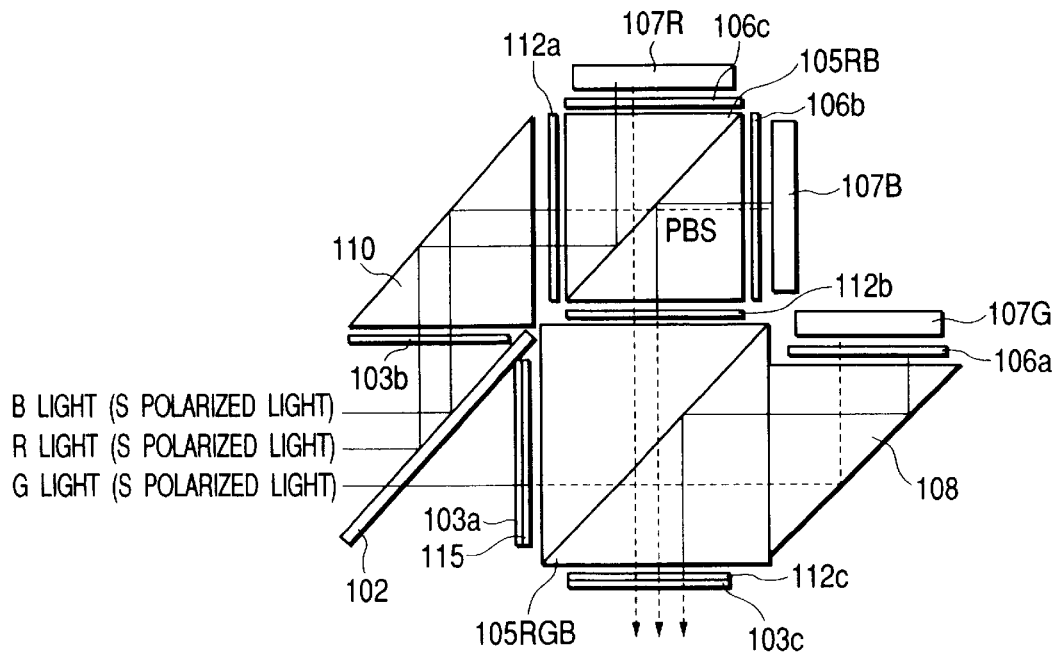
FIG. 9 is an overall plan view showing a ninth embodiment of the optical unit used in the image display device of the invention.

The ninth embodiment of the optical unit of the invention is next described while referring to FIG. 9.

FIG. 9 is an overall plan view showing the ninth embodiment of the optical unit used in the image display device of the invention. The light is shown by solid lines and dotted lines. The solid lines are the S polarized light and the dotted lines are the P polarized light. In the figure, the light from the light source (not shown in the drawing) passes along the polarization converter element 101 (not shown in the drawing) typified by a structure combining a ½ wavelength plate and a polarization beam splitter prism, and the P polarized light is converted into S polarized light, and the S polarized light is emitted unchanged as S polarized light.

In FIG. 9, the B light permeates the color separating mirror 102 and the P polarized light contained in the S polarized light components are removed in the polarizing plate 103a and after the light is converted to P polarized light in the polarization converter element 115, the light permeates the polarization beam splitter 105 RGB and is reflected by the full reflecting prism 108. The light is then input to the reflecting liquid crystal element 107B by way of the ¼ wavelength plate 106a. The G light input to the reflecting liquid crystal element 107B is here converted into S polarized light and after once again permeating the ¼ wavelength plate 106 is reflected by the full reflecting prism 108 and input to the polarized beam splitter 105RGB. The G light is S polarized light and so this time is reflected by the polarized beam splitter 105RGB.

After the S polarized R light and B light permeate through the polarizing plate 103b, they are reflected by the reflecting prism 110, and permeate the designated wavelength converter element 112a. The S polarized R light and B light are converted to P polarized light in the designated wavelength converter element 112a, and the R light permeates through unchanged as S polarized light. The B and R light are input to the color separating and color combining polarized beam splitter 105RB. The B light is P polarized light so it permeates through the polarized beam splitter 105RB, permeates through the ¼ wavelength plate 106b and is input to the liquid crystal display element 107B. Here the light is converted to S polarized light and reflected, is input again to the polarized beam splitter 105RGB by way of the ¼ wavelength plate 106b and here, the light is reflected. The R light is S polarized light so is reflected by the polarized beam splitter 105RB and is input to the liquid crystal display element 107B by way of the ¼ wavelength plate 106c. Here, after being converted to P polarized light it once again passes through the ¼ wavelength plate 106c and is input to the polarized beam splitter 105RGB. The R light is P polarized light and so this time permeates through the polarized beam splitter 105RGB. The R light and B light emitted from the polarized beam splitter 105RGB are input to the designated wavelength converter element 112b. The designated wavelength converter element 112b converts the S polarized B light into P polarized light, and the P polarized R light is permeated through as is without changes. The R light and B light that permeated through the designated wavelength converter element 112b is input to the color combining polarized beam splitter 105RGB. The R light and B light are both P polarized light and so permeate through the polarized beam splitter 105RGB and are input to the designated wavelength converter element 112c. The designated wavelength converter element 112c converts the G light from S polarized light to P polarized light. Accordingly, the R light, G light and B light permeate through the polarizing plate 103c as P polarized light and are input to the projection lens (not shown in drawing). The polarization directions of the R light and B light are not limited to the above directions, and the R light can input as is, as P polarized light, and the G light can be input as is, as S polarized light into the polarized beam splitter 105RB.

Figure 10:
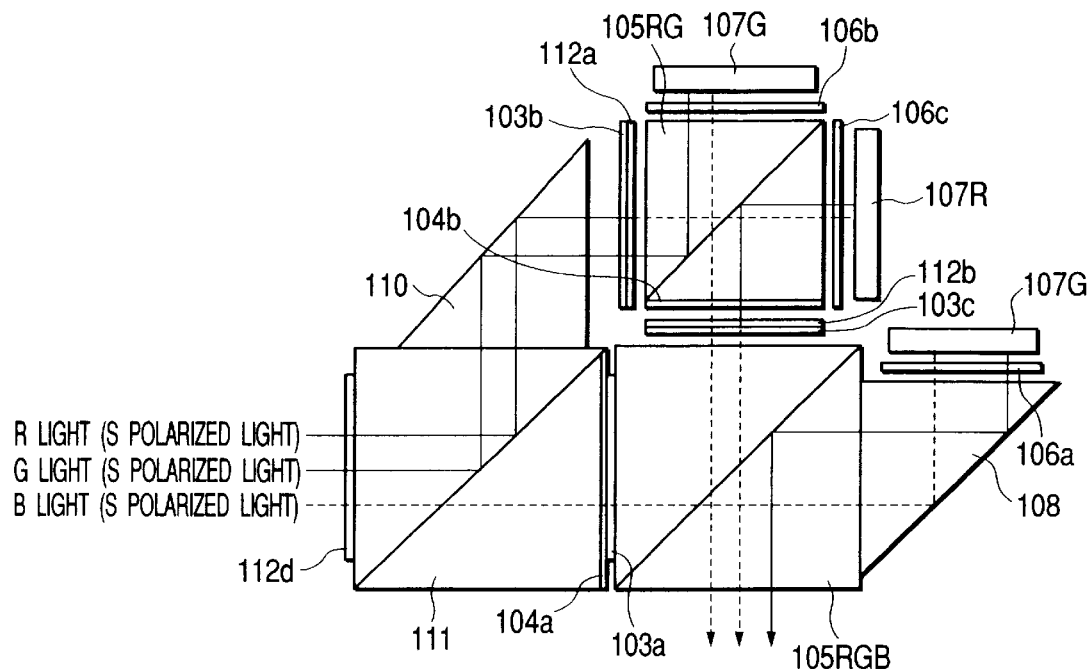
FIG. 10 is an overall plan view showing a tenth embodiment of the optical unit used in the image display device of the invention.

FIG. 10 is an overall plan view showing the tenth embodiment of the optical unit used in the image display device of the invention. The light is shown by solid lines and dotted lines. The solid lines are the S polarized light and the dotted lines are the P polarized light.

In this figure, the polarization direction of the R light, G light and B light converted to S polarized light by the polarization converter element (not shown in drawing) are input to the designated wavelength converter element 112d. Here, the point that the B light is converted to P polarized light, the point that a color separation beam splitter 11 is installed instead of the color separation mirror 102, and the point that a full reflecting prism 110 is installed instead of the reflecting mirror 109 are the points different from the embodiment of FIG. 8.

After the B light is converted from S polarized light to P polarized light by the designated wavelength converter element 112d, the B light permeates through the polarized beam splitter 111, and permeates through the color alignment film 104, the polarizing plate 103 (one example of rectification by a polarizing plate), and is input to the color combining polarized beam splitter 105RGB. The B light from then onward is it output from the polarized beam splitter 105RGB after passing through the same path as in the embodiment of FIG. 8. After the S polarized R and G light are reflected by the full reflecting mirror 110, the R and G light are input to the polarizing plate 103. The R and B light are afterward subjected to the same processing as in FIG. 8, and emitted from the polarized beam splitter 105RGB. The polarizing plate 103 may be installed at the position of the designated wavelength converter element 112d, and the polarizing plate, vapor deposition polarizing plate, polarizing separation sheet, etc., may be adhered to the prism 111 along with the designated wavelength converter element 112d. In this case, the prism 11, 110, polarizing beam splitter 105RGB and full reflecting mirror 108 can all be made to adhere, and the assembly operation thus improved. The alignment of the optical path is also easy.

Figure 11:
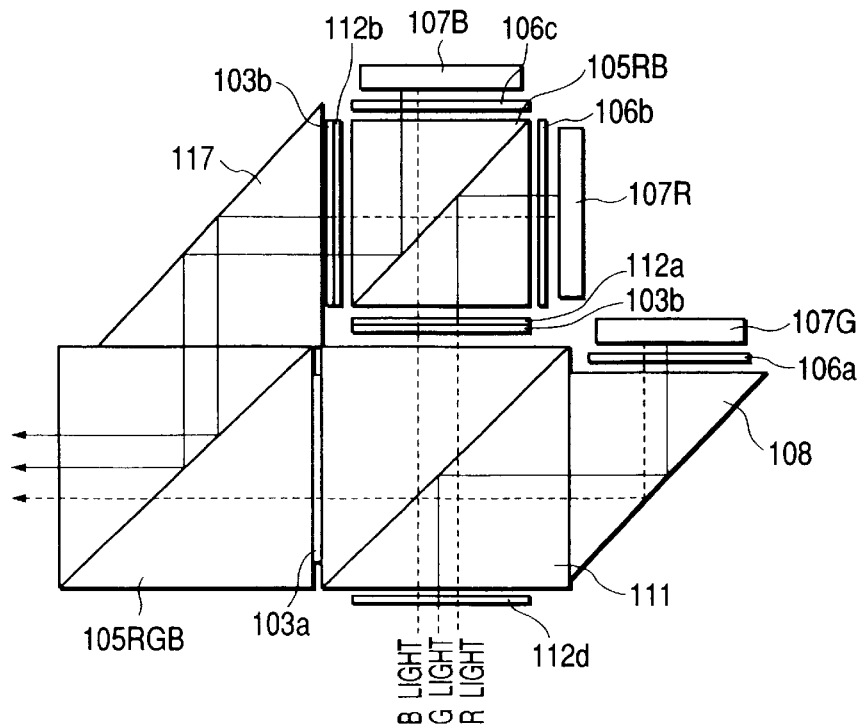
FIG. 11 is an overall plan view showing an eleventh embodiment of the optical unit used in the image display device of the invention.

FIG. 11 is an overall plan view showing the eleventh embodiment of the optical unit used in the image display device of the invention. The light is shown by solid lines and dotted lines. The solid lines are the S polarized light and the dotted lines are the P polarized light.

In this embodiment, the P polarized light from among the light of the optical unit permeates the polarization converter element (not shown in drawing) unchanged, and the S polarized light is converted to P polarized light. In the designated wavelength converter element 112d only the G light is converted to S polarized light and is input to the polarized beam splitter 111, and here only the S polarized G light is reflected, and further is reflected at the full reflecting prism 108, and is input to the G light liquid crystal display element 107G by way of the ¼ wavelength plate 106a, and input as P polarized light to the polarized beam splitter 111. Since the G light is P polarized light, it permeates this time through the polarized beam splitter 111, and further permeates through the polarizing plate 103a, color combining polarized beam splitter 105RGB and is input to the projection lens (not shown in drawing). The B light and R light are P polarized light and therefore permeate through the color separating polarized beam splitter 111 and the polarizing plate 103, and are input to the designated wavelength converter element 112a. In the designated wavelength converter element 112a, the R light is converted into S polarized light, and the B light is input unchanged as P polarized light to the color separating/combining (or analyzing) polarized beam splitter 105RB. Since the R light is S polarized light, it is reflected at the polarized beam splitter 105RB and is input to the R light liquid crystal display element 107R by way of the ¼ wavelength plate 106b, the light converted to P polarized light and permeated through the polarized beam splitter 105RB. Since the B light is P polarized light, it permeates through the polarized beam splitter 105RB and is input to the B light liquid crystal display element 107B by way of the ¼ wavelength plate 106c. Here, the light is converted to S polarized light, and since the light this time is S polarized light, it is reflected by the polarized beam splitter 105RB and input to the designated wavelength converter element 112b.

The R light is here converted to S polarized light, the B light permeates unchanged as converted S polarized light through the polarizing plate 103c and is reflected by the full reflecting prism 117, and is input to the combining polarized beam splitter 105RB. Since the R light and B light are S polarized light they are reflected at the polarized beam splitter 105RB, and input to the projection lens (not shown in drawing). In this embodiment, the polarizing plate 103a is not necessary, and in that case the full reflecting prism 108, polarized beam splitters 111, 105RG, the full reflecting prism 117 can all be adhered.

Figure 12:
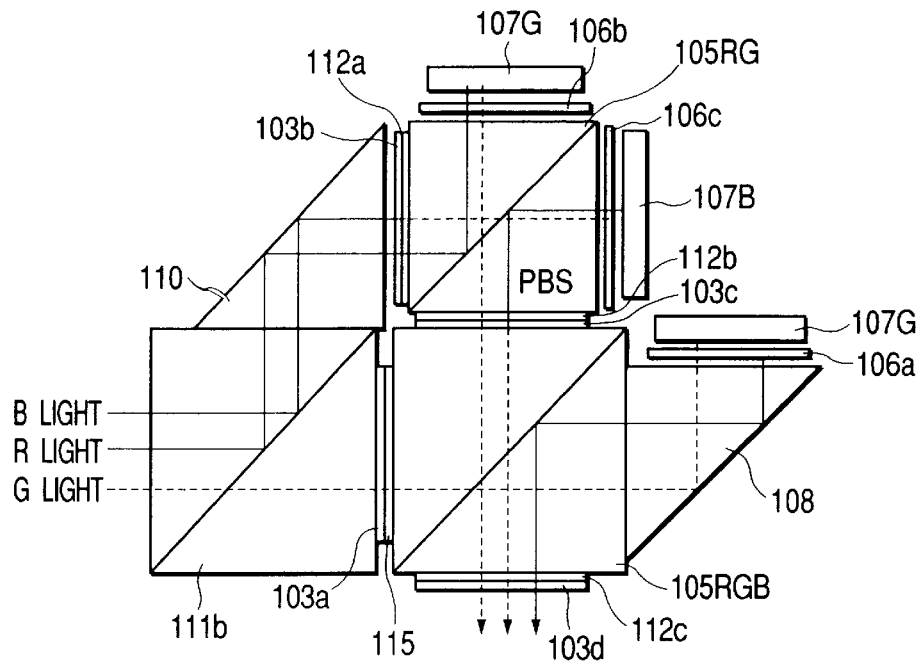
FIG. 12 is an overall plan view showing a twelfth embodiment of the optical unit used in the image display device of the invention.

FIG. 12 is an overall plan view showing the twelfth embodiment of the optical unit used in the image display device of the invention. The light is shown by solid lines and dotted lines. The solid lines are the S polarized light and the dotted lines are the P polarized light.

This embodiment differs from the embodiment of FIG. 10 in the point that a polarizing converter element 115 is installed instead of the designated wavelength converter element 112d, in the point that a dichroic prism is installed instead of a polarized beam splitter 111, and in the point that the position of the liquid crystal display element 107 is different. The color alignment film 104 is not shown in the drawing but the position is the same as in FIG. 8 and FIG. 10 so a description is omitted here.

In this embodiment, the R light, G light and B light are explained as being S polarized light. The G light permeates the dichroic prism 111b, and polarizing plate 103 and is converted to P polarized light by the polarized converter element 115, permeates through the polarized beam splitter 105RGB, is reflected by the full reflecting prism 103, and is input to the G light liquid crystal display element 107G by way of the ¼ wavelength plate 106a. The light is afterwards again input to the polarized beam splitter 105RGB by the same path as the B light of FIG. 10, and is here reflected.

The R light and B light on the other hand, is reflected by the dichroic prism 111b and reflected by the full reflective prism 110, the light permeates the polarizing plate 103b, and the S polarized B light is converted to P polarized light by the designated wavelength converter element 112a, and the R light is input to the color separation/combining polarized beam splitter 105RB without the polarization direction being changed. The P polarized B light permeates through the polarized beam splitter 105RB, permeates through the ¼ wavelength plate 106c and is reflected as S polarized light in the liquid crystal display element 107B. The B light is further reflected by the polarized beam splitter 105RB, converted to P polarized light by the designated wavelength converter element 112b, and after permeating the polarizing plate 103c, permeates the polarized beam splitter 105RB. Since the R light is S polarized light, it is reflected by the color separation/combining the polarized beam splitter 105RB, permeates the ¼ wavelength plate 106b, is reflected as P polarized light by the liquid crystal display element 107R, permeates the polarized beam splitter 105RB constituting the analyzing light, permeates the polarized beam splitter 105RB unchanged, and after the polarity is rectified by the polarizing plate 103c, permeates the polarized beam splitter 105RB. Of the R light, B light and G light, the G light is changed to P polarized light in the designated wavelength converter element 112c. Therefore, the R light, B light and G light are together polarity rectified as P polarized light by the polarizing plate 103d and afterwards input to the projection lens (not shown in drawing). Accordingly, the polarizing plate 103c may be eliminated, and polarity rectification performed on all the R light, G light and B light by the polarizing plate 103d. Further, the polarizing plate 103c need not be cooled, the structure is also simple, and the back focus distance is short and so is optically advantageous.

Figure 13:
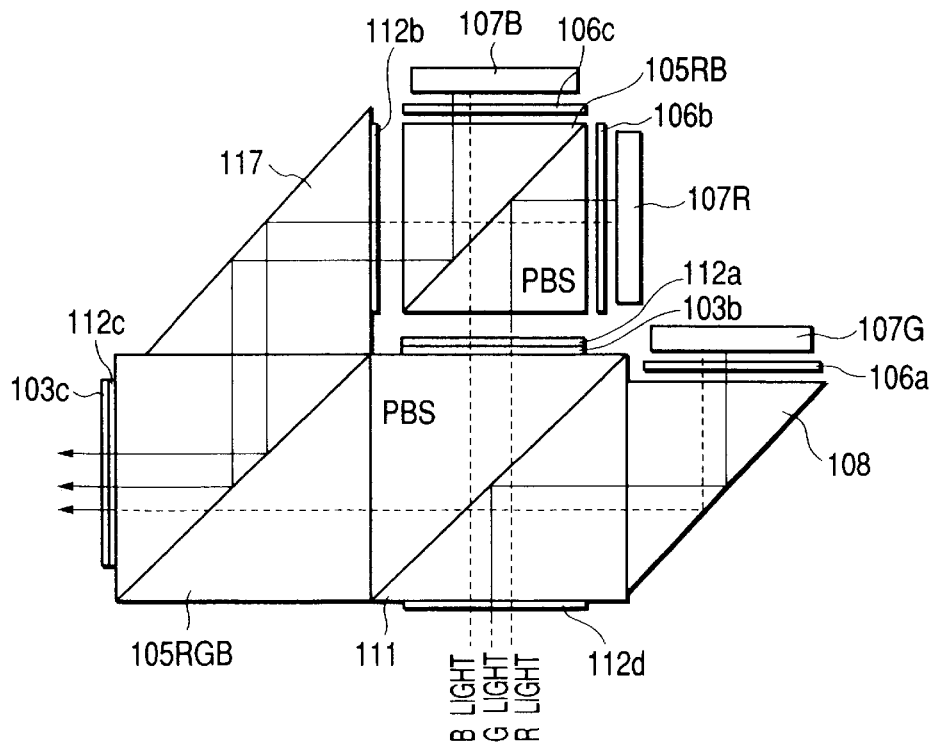
FIG. 13 is an overall plan view showing a thirteenth embodiment of the optical unit used in the image display device of the invention.

FIG. 13 is an overall plan view showing the thirteenth embodiment of the optical unit used in the image display device of the invention. The light is shown by solid lines and dotted lines. The solid lines are the S polarized light and the dotted lines are the P polarized light.

The embodiment of FIG. 13 differs from the embodiment of FIG. 11 in the point that a designated wavelength converter element 112c is installed on the output side of the polarized beam splitter 105RB, and further in that a polarizing plate 103c between the fully reflecting prism 117 and the polarized beam splitter 105RB in FIG. 11 is here installed on the output side of the designated wavelength converter element 112c, and that the polarizing plate 103c has been removed from between the polarized beam splitter 105RB and the polarized beam splitter 111.

After the G light has been reflected by the liquid crystal display element 107G along the same path as in FIG. 11, the G light permeates the polarized beam splitter 105RB and the polarized beam splitter 111 as polarized P light. After the R light and B light have been reflected by the respective liquid crystal display elements 107R, 107B along the same path as in FIG. 11, the P polarized R light is converted to S polarized light in the designated wavelength converter element 112b, and the R light and the B light are reflected as S polarized light from the full reflecting prism 117, and further reflected by the polarized beam splitter 105RB. Afterwards, only the G light is converted from P to S polarized light by the designated wavelength converter element 112c, the R light, G light and B light are all input as S polarized light to the projector lens (not shown in drawing) by way of the polarizing plate 103c. Further, the color separation/combining function works adequately even if the designated wavelength converter element 112b and the polarizing plate 103b are removed. Also, if the sizes of the polarized beam splitters are set so that the polarized beam splitter 105 is largest, a polarized beam splitter 105RB is smallest, and the polarized beam splitter 111 is midway between these sizes, then even if the light input to the color separation/combining system from the lighting system is set telecentrically, the eclipsing of the input light by the polarized beam splitter and the full reflecting prism can be prevented.

Figure 14:
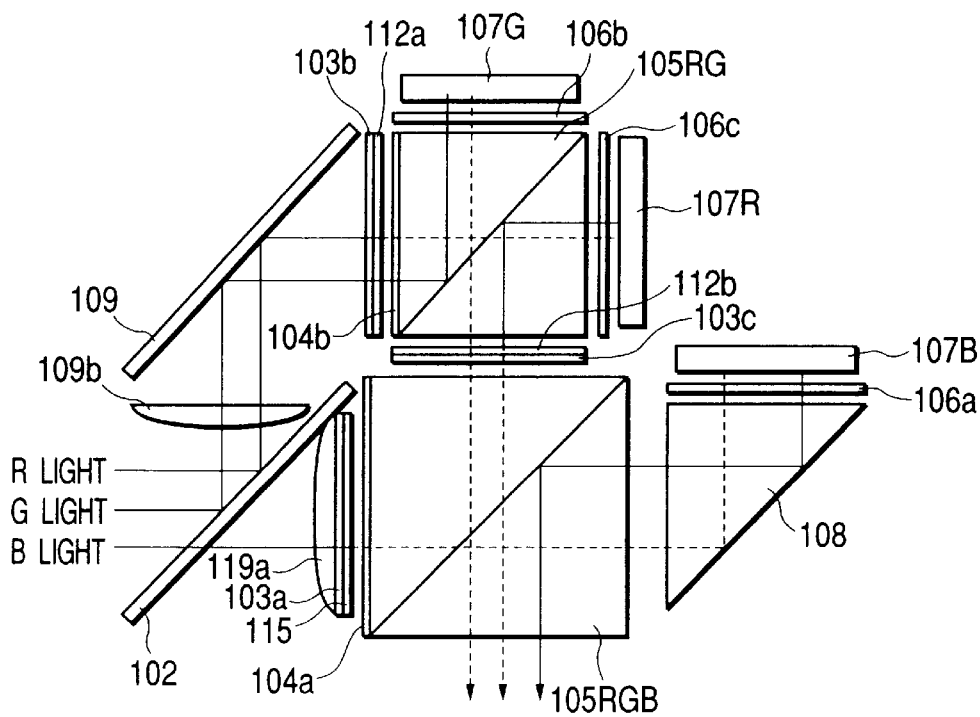
FIG. 14 is an overall plan view showing a fourteenth embodiment of the optical unit used in the image display device of the invention.

FIG. 14 is an overall plan view showing the fourteenth embodiment of the optical unit used in the image display device of the invention. The light is shown by solid lines and dotted lines. The solid lines are the S polarized light and the dotted lines are the P polarized light.

The embodiment of FIG. 14 differs from the embodiment of FIG. 8 in the point that a condenser lens 119a has been installed between the color separation mirror 103 and the color combining polarized beam splitter 105RGB, and in the point that a condenser lens 119b has been installed between the color separation mirror 102 and the reflecting mirror 109. Therefore, the reflection and the permeance paths of the G light, R light and B light are the same.

Figure 15:
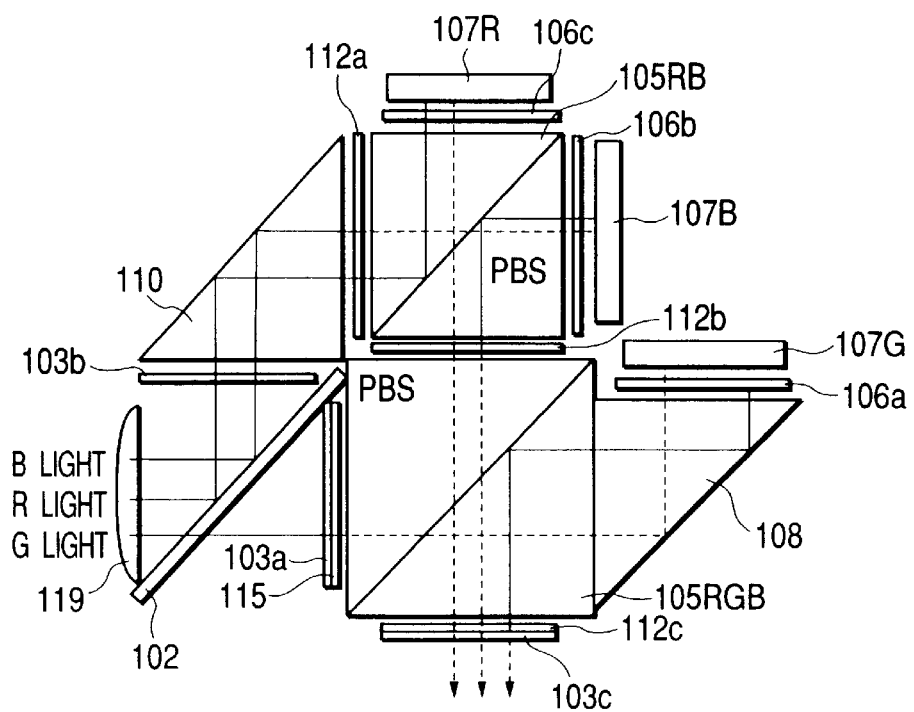
FIG. 15 is an overall plan view showing a fifteenth embodiment of the optical unit used in the image display device of the invention.

FIG. 15 is an overall plan view showing the fifteenth embodiment of the optical unit used in the image display device of the invention. The light is shown by solid lines and dotted lines. The solid lines are the S polarized light and the dotted lines are the P polarized light.

The embodiment of FIG. 15 differs from that of FIG. 9 in that a condenser lens 119 has been installed on the incident side of the color separation mirror 102, the reflection and the permeance paths of the G light, R light and B light are the same as in FIG. 9.

The effect rendered by the embodiments from FIG. 8 through FIG. 15 are next explained.

The liquid crystal display element 107B of FIG. 8, FIG. 10 and FIG. 14, and the liquid crystal display element 107G in FIG. 9, FIG. 11, FIG. 12, FIG. 13 and FIG. 15 need not always be reflected by the full reflective prism 108, and need not face the direct combining polarization beam splitter 105RGB and polarization beam splitter 111.

The embodiments in FIG. 8 through FIG. 15 may be comprised of a color separating means such as the color separator mirror 102, the polarization beam splitter 111, and color separator dichroic prism 111b, and a color separating/combining means such as the color separation/combination polarization beam splitter 105RG, and polarization beam splitter 105, and the color combining means shown by the color combining polarization beam splitter. The RGB color separation and combining can therefore be achieved with a lightweight, low cost and simple structure.

The optical path length of the R light, B light and G light can be made to the same length by comprising all of the embodiments with a first reflecting means such as a reflection mirror 109, and full reflecting prism 110, 117, and a second reflecting means such as a full reflecting prism 108. A structure configured in this manner along with being lightweight and low cost also allow various placements. In other words, instead of rectangular prism block, a triangular prism having the same optical path length and made from the same glass material will be almost twice as light and also reduce the cost for materials.

The reflecting means constituted by the reflecting mirror 109, full reflecting prisms 110, 117 and the full reflecting prism 108 can utilize aluminum, silver vapor deposition mirrors, reflective prisms or mirror vapor deposition prisms. The reflection rate can in this way be improved and compactness and a lighter weight also achieved.

These reflecting means can also utilize a dichroic mirror or dichroic prism coated with a dielectric multilayer film. A reflecting means of this type allows cutting out unnecessary light and allows aligning the color. Further, by utilizing the color alignment film in this reflecting means, even finer color alignment can be achieved.

In the embodiments 8 through 10 of this invention, the R light, G light and B light is separated by the color separating means constituted by the color separation dichroic prism 111b into a first, second and third lights. The optical axis direction of the first and the second light is bent for example in an approximately right-angled direction by the reflective mirror 109, and full reflective prisms 110, 117, etc., and input to the color separation/combining means such as the polarized beam splitter 105RG and polarized beam splitter 105RB. The light input to this color separation/combining means is separated into a first and a second light and mutually arrayed in a right angle, and input to image display elements constituted by light valves corresponding to the respective light colors, and the first light and the second light reflected by these image display elements are input to a color combining means. After the third light is separated by the color separating means, the light travels along the via the color combining means comprised by a polarized beam splitter 105RB installed in the direction of the optical axis at the output of the third light, and is bent for example in a right-angle direction by the second reflecting means, and input to the image display element constituted by the light valve for the third light, and after the image display devices constituted by light valves reflect the respective colors of the light, the image light emitted from these image display devices is combined with the first and second light per the color combining means. Accordingly, in this embodiment, the contrast rate and the efficiency of each color of R light, G light and B light as the first through third colors can be optimized.

Also in these embodiments, in the polarized light unified into S polarized light or P polarized light by the lighting system, the two colors of the first and second light from the R light, B light and G light separated by the color separating means, the optical axis is bent at a right angle by the first reflecting means; and of the two colors of the first and second light, the first light is set in a polarizing direction and the second light is set in a different direction by the designated wavelength converter element, so for example if the first light is S polarized light, then the second light color is input to the color separation/combining means after being converted to P polarized light. The light input to this color separating/combining means is separated into a first light and a second light, mutually arranged into right angles, and input to an image display element constituting the write valve for the corresponding light. After the remaining third light has been separated by the color separating means, a polarized converter element such as the polarized converter element 115, ½ wavelength plate installed along the optical axis output of the third light is converted to a polarization direction and for instance the S polarized light is converted to P polarized light (See FIG. 8) and the light passes through a color combining means installed on the output side of this converter element such as a polarized beam splitter 105RGB along the optical axis of the third light. The third light is further bent at a right angle by the second reflecting means and input to the image display element constituted by a light valve matching the color of the third light. In this case, the light can simply be input to the image display element constituted by the light valve for that color by way of an optical media material such as glass or air, in the direction of the output axis of the of the color combining means, without using the second reflecting means. The light is reflected by the image display element constituting the light valve for the respective color. of the image light output from these image display elements, the first light is emitted from the image display element as P polarized light, the second color light is emitted from the image display element as S polarized light, and the second light color is emitted from the image display element as S polarized light and each, combined by the color combining/separating means such as the polarized beam splitters 105RB, 105RG, or the black display light analyzed, and output in a direction intersecting the input optical axis of the color separation/combining means. Afterwards, the second color light is converted from S polarized light to P polarized light by the designated wavelength converter element installed on that optical axis (such as designated wavelength converter element 112b), the polarization direction aligned with the P polarized light of the first light color and input to the color combining means. On the other hand, after the image display element reflects the third light, the polarization direction is changed by th image display element so that if the input light is P polarized it is changed to S polarized light, and input to the color combining means by way of the second reflecting means. After the third light is reflected in the color combining means, it is combined with the P polarized first and second light, and output to the third light color combining means from an output optical axis separate from the input optical axis. Also, in the case of P polarized light input to the color separating means, the polarized converter element 115 or ½ wavelength plate for the above described third light are not required, and the P polarized light permeates as is, through the color separating means, and is input to the reflecting means. The first light and the second light must be respectively separated into P polarized and S polarized light so that as described above, a designated wavelength converter element must be installed as a color separating means on the light input/output optical path. In such a case, the polarized converter element for the third light is eliminated so that a reduced cost can be achieved.

In this embodiment, the first color separating means can reflect the R light and the G light, and the B light made to permeate through as shown in the eighth embodiment. A structure can be utilized wherein the R light and the B light can be made to permeate by installing a color combining/separating prism on the input position of the light of the full reflecting prism, and the B light reflected. Further, the R light and B light can be made to permeate through and the G light reflected as shown by the embodiment of FIG. 11. Also in this structure, R light and G light can be made to permeate through and the B light may be returned.

Similarly, the R light and the B light can be reflected and the G light made to permeate through as shown in FIG. 9. Alternatively, a structure may be employed wherein the R and B light can be made to permeate through and the G light returned by means of installing the color separating prism at the input position of the full reflecting prism 108.

A structure can also be used wherein the G light and B light are returned, and the R light made to permeate through, or the G light and B light made to permeate through and the R light returned.

Also, in this embodiment, the color separating means may be comprised of a dichroic prism or a dichroic mirror.

The color separator means and the color combining means may be comprised of a polarized separating/combining element constituted by a polarized beam splitter.

In this embodiment, a designated wavelength converter element is installed between the first color separating means and the color separating/combining means. Also, a structure comprised by designated wavelength converter elements installed between a first color separating means and a color combining means, and between a color separating/combining means and a color combining means may be used to improve the efficiency of the R, G, B light and the contrast rate.

Further in these structures, a polarizing plate (or polarity rectifier element) may be installed between a first color separating means and a color combining means, and between a color separating/combining means and a color combining means to improve the efficiency of the R, G, B light and the contrast rate.

Each color separating/combining means acquires a peak value of optical characteristic so that the permeance rate or the reflection (efficiency) rate for the two colors that are input are optimal. For example by a structure having a polarized beam splitter 105RG for optimal characteristics in the color combining/separating means of the R light and B light, or a polarized beam splitter 105RB for optimal characteristics in the color combining/separating means of the R light and B light, or a structure having a polarized beam splitter for optimal characteristics in the color combining/separating means of the G light and B light. The efficiency of the R, G, B light and the contrast rate can therefore be improved by using the above structures.

The color separating/combining means and the color combining means consist of polarized light separation and elements for light analysis. Utilizing these elements allows the contrast rate of the R, G, B light to be improved.

The color separating/combining means and the color combining means can eliminated the possibility of light eclipses by making the size of the color separating/combining means larger than the size of the color combining means.

In this embodiment, a structure to combine the light of the one color (R light, G light, or B light) of S polarized light, with the light of the two colors (R light, G light, or B light) consisting of P polarized light input from mutually intersecting directions by the color combining means, and the three colors emitted along the optical axis of the P polarized light.

In this embodiment, the optical axis of the projection means is parallel with the optical axis of the color combining means however the optical axis may also be shifted.

In the embodiment shown in FIG. 9, a portion of the reflecting mirror is made into full reflecting prisms 108, 110 so that along with being able to align the optical path length for the R light, G light and B light, the back-focus can be shortened.

Errors in the assembly accuracy can be reduced by bonding the full reflecting prism 108, the color combining prism and the polarized beam reflector 105RGB.

The light output from the G light liquid crystal display element 107G is made into S polarized light and the light output from the R light liquid crystal display element 107R is made into P polarized light, and the B light output from the B light liquid crystal display element 107B is made into S polarized light so that the efficiency of the R, G, B light and the contrast rate can therefore be improved by using the above structures.

In the embodiment of FIG. 11, after the light permeates through the designated wavelength converter element 112d, and is color separated by the polarized beam splitter 111 constituting the color separating means, the first and second light colors are input and output from the matching liquid crystal display element by way of the color separating/combining means (such as the polarized beam splitter 105RG), are combined in the color separating/combining means, are output from an intersecting optical axis separate from the input axis, and input to the color combining means by way of the mirror (full reflecting mirror 117). The third color is input and output to the liquid crystal display element matching the third light by way of the mirror (full reflecting mirror 108) and input to the color combining means. Afterwards, the first, second and third lights are combined by way of the color combining means. If a ½ wavelength plate is input to the location of the polarizing plate 103, or the designated wavelength converter element 112, the output directions of the first, second and third light can be output even if in directions parallel to or intersecting the optical axis of the lighting system.

In the embodiment of FIG. 12, the dichroic mirror 102 shown in FIG. 1 is substituted with the dichroic prism 111b. This substitution allows the effective length of the input light path up to the liquid crystal display element to be shortened and the dispersion of the light can be suppressed. In particular if a condenser lens 119 such as shown for example in FIG. 15 is inserted prior to the input to the dichroic prism 111b, then when set to a telecentric system, the variations in the optical ray angle for the polarizing plate and the dichroic mirror, dichroic prism, and polarized beam splitter can be suppressed to an absolute minimum, and the adverse effects of prism inner surface reflection due to light diffusion can be reduced.

As shown in the embodiment of FIG. 13, by aligning the prism surfaces of the polarized beam splitter 111 and the polarized beam splitter 105RGB, when the surfaces of the polarized beam splitter 111 are aligned with the surfaces of the full reflecting mirror 108, the assembly accuracy is improved and accurate positioning is easy to achieve.

As shown in FIG. 14, when set to a telecentric system, changes in the light ray angle can be kept to a minimum in the polarizing plate, dichroic prism, and polarized beam splitter, by inserting the condenser lenses 119a, 119b on each optical path, and the adverse effects of prism inner surface reflection due to light diffusion can be reduced.

Also, by installing a condenser lens 119 prior to the first color separating means as shown in FIG. 15, when set to a telecentric system, changes in the light ray angle can be kept to a minimum in the polarizing plate, dichroic prism, and polarized beam splitter, and adverse effects of prism inner surface reflection due to light diffusion can be reduced.

In the embodiment of FIG. 8, the color alignment film 104 may for example be a dielectric multilayer film vapor deposited on the direct polarized beam splitter or dichroic prism, and may be a color film or a color filter such as of colored glass wherein a polarized beam splitter or a dichroic mirror is vapor deposited with a dielectric multilayer film on a glass plate or ½ wavelength plate, ¼ wavelength plate, designated wavelength converter element, or polarizing plate. What is essential is that any suitable material be capable of lowering the permeance rate of the designated wavelength region.

In this embodiment, the full reflecting mirror 108 is not always required and may be installed facing the output surface of the B light of the color combining polarized beam splitter 105 RGB.

However, since the height of the optical path R, G, B light can be aligned by installing the full reflecting prism 108 such as in this embodiment, the irregularities in the color can be eliminated.

In this embodiment, the optical unit may be comprised of a color separating/combining means such as a color separator mirror 102 and a polarization beam splitter 105RG (or dichroic prism), a color combining means such as a polarization beam splitter 105RGB (or dichroic prism), so that R light, G light and B light color separation and combining can therefore be achieved with a lightweight and low cost structure.

In FIG. 8, FIG. 10 and FIG. 14, the wavelength band can be selected to lower the wavelength of the light on the color alignment film 104, and along with performing color alignment, satisfactory color restoration can be achieved. For example by selecting a wavelength to lower the permeance ratio in the color alignment film 104a, 104b, the permeance rate in the cyan wavelength region and the yellow wavelength region can be lowered to achieve a satisfactory color. The yellow components can be increased to make the image brighter. In such cases, the alignment film 104 can be adjusted to cut the cyan components so that the white balance is maintained.

In the embodiment of FIG. 8, the color alignment film 104a was installed on the B light input surface of the polarizing beam splitter 105RG but as shown in FIG. 10, the color alignment film 104a may be installed on the output side of the B light polarizing beam splitter 111. In FIG. 8, the color alignment film 104b was installed on the R light and B light incident side of the (detecting) color separation/combining polarizing beam splitter 105RG but as shown in FIG. 10, it may be installed on the output side of the R light and B light of the color separating/combining polarizing beam splitter 105RG, or may be installed on the incident side of the R light and B light of the color separating/combining polarizing beam splitter 105RG or dichroic prism. In other words, the same effect can be obtained whether the color alignment film 104 is installed on the incident side (surface) or output side (surface) of the dichroic prism or color combining side of the R light and B light of the color separating/combining polarizing beam splitter or analyzing polarizing beam splitter.

In the embodiment of FIG. 9, color alignment can be performed by adjusting the dichroic mirror such as the color separator mirror 102 and the designated wavelength converter elements 112a, 112b. However, the following examples are applicable to other embodiments and not just the embodiment of FIG. 9.

Figure 16A:
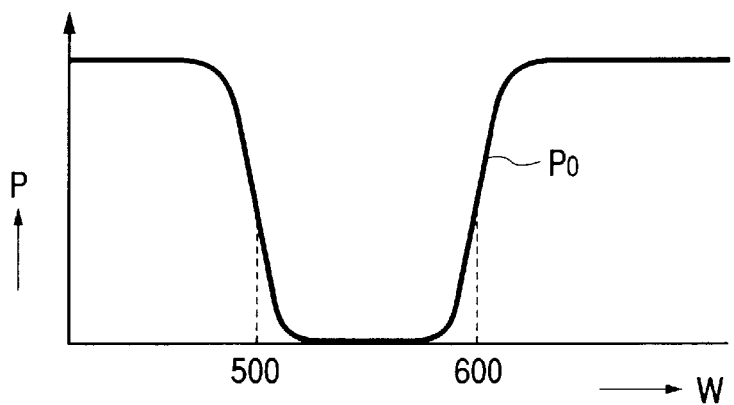
FIGS. 16A, 16B and 16C are drawings showing the permeance rate of the light.
Figure 16B:
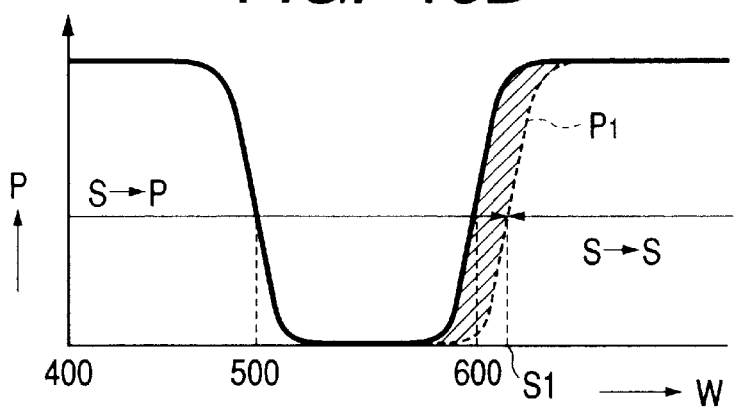
Figure 16C:
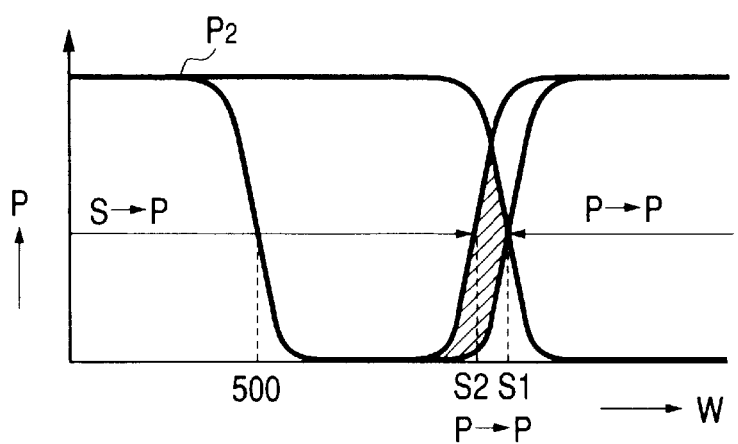

The example for this case is described while referring to FIG. 16.

FIGS. 16A and 16B are drawings showing the spectroscopic characteristics of the light permeance rate. The horizontal axis is the wavelength W and the vertical axis is the light output P. FIG. 16A shows the output characteristic curve of the color separator mirror 102 of FIG. 9, configured for example, so light from 500 nm to 600 nm does not permeate through. Of the light permeating through the color separating mirror 102, light within a wavelength S1 longer than a wavelength of 600 nm is converted from S to P polarized light, and configures a characteristic curve P1 of designated wavelength converter element 112a so that S polarized light of wavelength greater than S permeates through as is. This light is reflected by the liquid crystal display elements 107B, 107R and the polarized light converted, light of a wavelength up to S1 is converted to S polarized light, light on a wavelength of more than S1 is converted to P polarized light. As shown in FIG. 10C, the light below wavelength S2 is converted from P to S polarized light, and the light above a wavelength S1 is not polarized and when it permeates the designated wavelength converter element 112b unchanged as P polarized light having the characteristics of line P2, the S polarized light of wavelength S2 through S1 is unchanged so that the light in this region is reflected by the polarized beam splitter 105RG and is not therefore input to the projection lens. The light on the wavelength S2 through S1 can in this way be cutoff.

In this way, by combining the reflective mirror 110 and the designated wavelength converter elements 112a and 112b, the permeance rate of the designated wavelength can be changed. In this embodiment, the yellow color can be eliminated by setting 600 nm to 580 nm.

In the same way, the brightness can be improved by changing the structure of the designated wavelength converter element 112 and the color alignment film 104. If the objective for example is to improve the brightness of a light ray, a half-value of color alignment film 104 and a half value of designated wavelength converter element 112 can be combined and light in the vicinity of 500 nm for example light from 500 nm to 515 nm can be cut out, so that a light ray in the vicinity of 580 nm can be input and the brightness improved and the white balance can also be improved.

The same effect can also be obtained by combining the color alignment mirror 104 and the dichroic mirror 102. In this embodiment the dichroic mirror 102 and the full reflecting mirror 110 can be substituted with dichroic prisms.

Therefore in the above description, the dichroic mirror 102 and the full reflecting mirror 110 can be substituted with dichroic prisms.

The polarizing plate 103b is installed in the vicinity of the polarized beam splitter 105RG in the embodiments of FIG. 8 and FIG. 9, and the polarizing plate 103c is installed in the vicinity of the polarized beam splitter 105RG. When these polarizing plates 103 are attached in the vicinity of the polarized beam splitter, the boundary is reduced, and the light permeance rate can be improved. The polarized beam splitter 105RG has a large heat radiating effect so that heat from the polarizing plate 103 is absorbed and the cooling ability of the polarizing plate 103 is increased.

The optical units of FIG. 8 and FIG. 9 can be comprised of dichroic prism. In this case, a polarizing plate 103 can be attached to the dichroic prism. In such a case, the polarizing plate 103 is preferably comprised of film.

In the embodiments of FIG. 8 and FIG. 9, when installing a color alignment film on the incident side of the dichroic mirror such as a color separator mirror 102, when performing for example vapor deposition of a dielectric multilayer film, when the film thickness is changed so that the portions with a large light input angle are thick and portions with a small light input angle are thin, a shift occurs in the wavelength value so that the color of the output light and variations in the color can be adjusted.

When the optical units such as shown in FIG. 8 and FIG. 9 are comprised of dichroic mirrors and dichroic prisms, in other words, when comprised of dichroic prisms or dichroic mirrors such as color separation mirrors 102, and when a dichroic prism is installed instead of the dichroic prism, the same effect can be obtained as when the thickness of a color alignment file is changed and installed on these input surfaces.

In the embodiments of FIG. 8 and FIG. 9, the glass material can preferably be changed in the color separating/combining polarized beam splitters 105RG, 105RB and polarized beam splitters 105RGB. A glass material with a low birefringence (double refraction) such as PBH 53 for example can be selected for polarized beam splitters 105RG, 105RB, and for instance, a lightweight and low cost glass material can be selected such as BK7 for the color combining polarized beam splitters 105RGB to achieve ideal performance, low cost and a low weight.

A structure wherein the color separator mirror 102 can be made to comprise the dichroic prism and polarized beam splitter, and the polarized beam splitter 105 can be substituted with a dichroic prism is also applicable in the same way. In this case, the color separating dichroic prism just the same as the color combining polarized beam splitter or dichroic prism can also use lightweight, low cost glass material.

In FIG. 8 and FIG. 9, when the volume of the polarized beam splitters 105RG, 105RB is set to V1, the volume of the color combining polarized beam splitters 105RGB is set to V2, then V1 can be set smaller than V2, and when a glass material as described above is utilized, performance can be optimized according to the usage characteristics, and a low cost glass material can be used, and the weight also reduced. As a variation on the structure, a dichroic mirror or a dichroic prism can be used as the color separator mirror 102, and a dichroic prism can also be used instead of the polarized beam splitter 105. When in particular, the size of the color separating and color combining polarized beam splitter 105 and dichroic prism is increased, eclipsing of the input/output light beam can be prevented. In this case, when the object is the permeance ratio of the glass material or the reflectance rate, the performance can be improved, costs reduced and a glass material of a lighter specific gravity used to obtain a lighter weight by changing the glass material of the polarized beam splitter 105 or dichroic prism. If the glass material of the analyzing polarized beam splitter is highly refractive, with a light elasticity coefficient of $0.5\times10-12N/m2$, a size of □32, and the stress is within $5.3\times104$ Pa, then the light extinction ratio is satisfactory, yet if the specific gravity of the color combining and color separating dichroic prism and polarized beam splitter is light, and if a glass material with a good overall permeance ratio also including the dielectric multilayer film is utilized, then good performance, lightweight and low cost can be obtained even when the volume was increased to prevent eclipsing of the light rays.

Next, the case when installing the liquid crystal element in the polarized beam splitter 105 is explained while referring to FIG. 17.

Figure 17A:
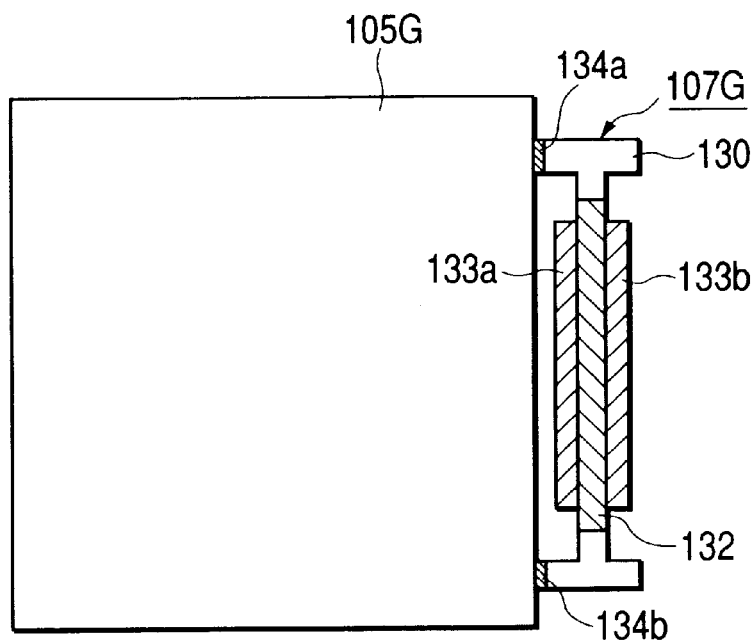
FIGS. 17A and 17B are cross sectional plan views showing the embodiment for installing the liquid crystal element on the polarized beam splitter.
Figure 17B:
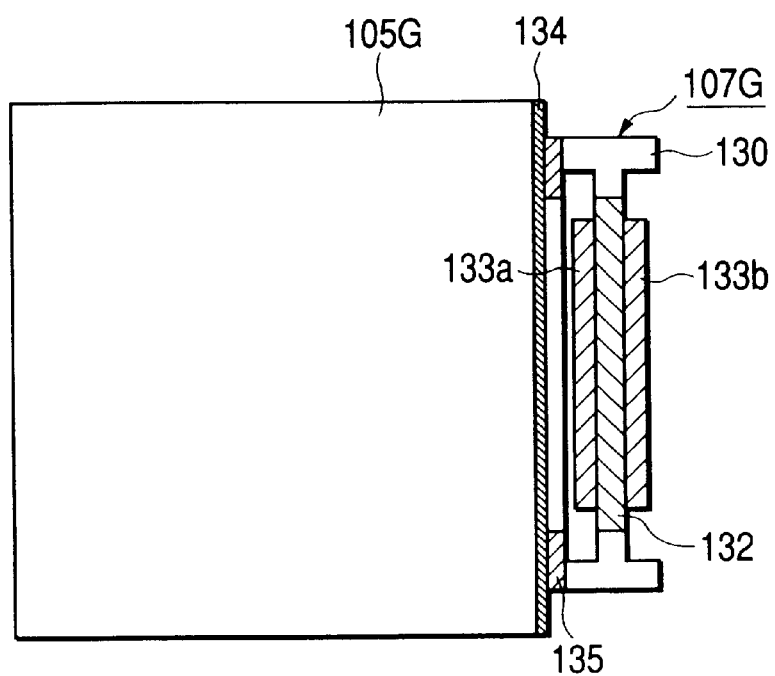

FIG. 17A and FIG. 17B are fragmentary cross sectional plan views showing a the embodiment for installing the liquid crystal element in the polarized beam splitter. In FIG. 17A, a liquid crystal material 132 is filled into the frame 107 of the liquid crystal element 107G. A cover glass 133a, 133b is installed on both sides. After aligning the position of the liquid crystal element 107G, the frame 130 is directly bonded to the polarized beam splitter 105G by the adhesive 134a, 134b. A UV adhesive solution or a heat hardening adhesive may also be utilized as the adhesive for strength.

In this embodiment, the cover glass 133a and the polarized beam splitter 105G may be bonded with adhesive or clamped.

Another embodiment is shown in FIG. 17B installed with an alignment plate 134. This alignment plate 134 is glued with bonding agent 134 to the polarized beam splitter 105G. After adjusting the position of the liquid crystal element 107G relative to the polarized beam splitter 105G, the frame 130 is glued or clamped to the alignment plate 134. Also, the air layer between the cover glass 133a and the polarized beam splitter 105G can be eliminated by filling with adhesive or silicon oil.

The light utilization efficiency of this embodiment can be increased by reducing the boundary between the polarized beam splitter 105G and the liquid crystal element 107G.

The embodiment of FIG. 17 was explained using the polarized beam splitter 105G and G light liquid crystal element however the same effect can be achieved by directly installing an R light, B light liquid crystal element 107R, 107B in the polarized beam splitter 105G.

Next, the assembly of the polarized beam splitter is described utilizing FIG. 18.

Figure 18A:
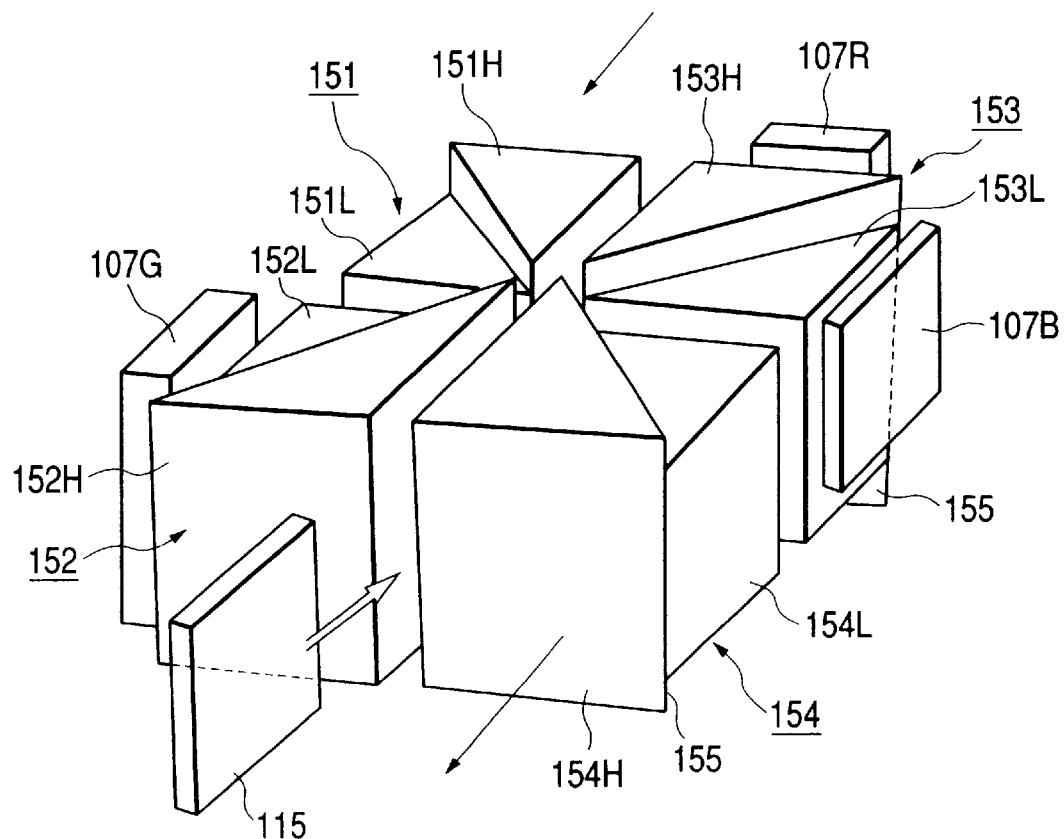
FIGS. 18A and 18B are perspective views showing an embodiment of the polarized beam splitter and an assembly base piece.
Figure 18B:
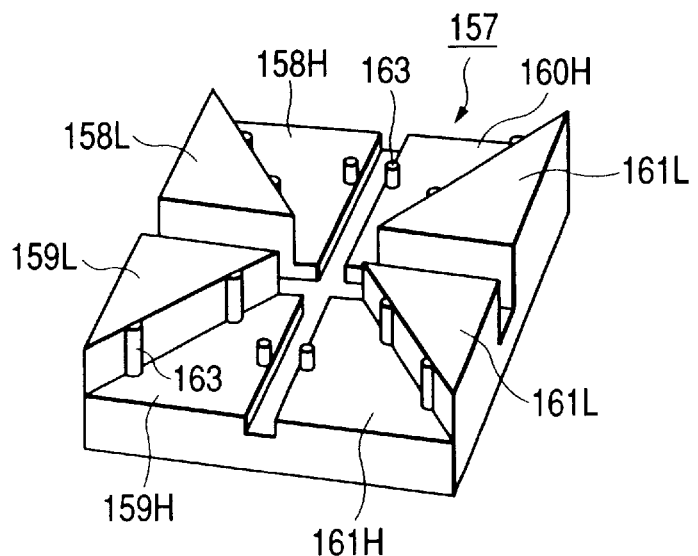

FIG. 18A is a perspective view showing an embodiment of the polarized beam splitter. FIG. 18B is a perspective view showing an embodiment of the assembly structure of the polarized beam splitter. This embodiment has a structure comprised of four prisms as the dichroic prisms or polarized beam splitter in addition to the color separating mirror 102 and full reflecting mirror 110 shown in FIG. 8.

In FIG. 18A, the number 151 denotes a color separating polarized beam splitter or dichroic prism and is comprised of a tall triangular column-shaped prism 151H and a short triangular column-shaped prism 151L for installing a step in the alignment surfaces. The numeral 152 denotes a G light polarized beam splitter, and is comprised of a tall triangular column-shaped prism 152H and short triangular column-shaped prism 152L for installing a step in the alignment surfaces. The reference numeral 153 is an R light and B light polarized beam splitter and is comprised of a tall triangular column-shaped prism 153H and a short triangular column-shaped prism 153L for installing a step in the alignment surfaces. The colors in the light are separated by the color separating polarized beam splitter or dichroic prism, and the G light is reflected by the polarized beam splitter 152 or dichroic prism and input to the G light liquid crystal element 107G. The G light reflected from the liquid crystal element 107G is reflected by the color combining polarized beam splitter 154 and input onto the projector lens (not shown in drawing).

The R light and B light separated in the polarized beam splitter 151 are separated in the polarized beam splitter 153 and input respectively to the liquid crystal elements 107R, 107B. The R light and B light reflected by the liquid crystal elements 107R, 107B permeates the polarized beam splitter 154 and is input to the projector lens (not shown in drawing).

A polarizing plate, ½ wavelength plate, and designated wavelength converter element are inserted in the gap between each polarized beam splitter. Steps 155 are respectively installed above and below the polarized beam splitters 151–154 by means of the tall triangular column-shaped prism and short triangular column-shaped prism assembly. In FIG. 18B, the reference numeral 157 is an assembly structure. The stands 158H–161H are mounted with the long triangular prisms 151H–154H and the stands 158L–161L are mounted with the short triangular prisms. The protrusion 163 mounted in the assembly structure piece 157 is used for positioning.

During assembly of the polarized beam splitter in the assembly structure 157 as shown in FIG. 18A, the positioning protrusions 163 in the stands 158H–161H are mounted to make contact with the bottom of the long triangular prisms 151H–154H, and the positioning protrusions 163 in the stands 158L–161L are mounted to make contact with the bottom of the short triangular prisms 151L–154L. A groove is formed between each of the polarized beam splitters, and a polarizing plate and designated wavelength converter element installed. The positioning precision can be further improved at this time by installing springs or foam, etc.

In this embodiment, a step section was installed in the polarized beam splitters 151–154 and positioning performed by means of these step sections so that the surface of the dielectric multilayer film of the polarized beam splitter forms the reference surface, the assembly precision is improved and the performance therefore enhanced.

As can be clearly seen in the figure, in this embodiment the color separating beam splitter 151 widens the light input surface area of the prism 151, and the output side of the polarized beam splitter or in other words, widens the output side surface area of the prism 154H of the color combining polarized beam splitter. The light permeance surface area is preferably made smaller as the light travels forward up to the liquid crystal display elements, and as the light from the liquid crystal display elements travels forward, the light permeance surface area is preferably set larger to prevent eclipsing of the light. An effect of such kind can be achieved in this embodiment.

In FIG. 18, the same effect can of course be obtained by a structure comprising a portion of the polarized beam splitter with a dichroic prism.

Figure 19:
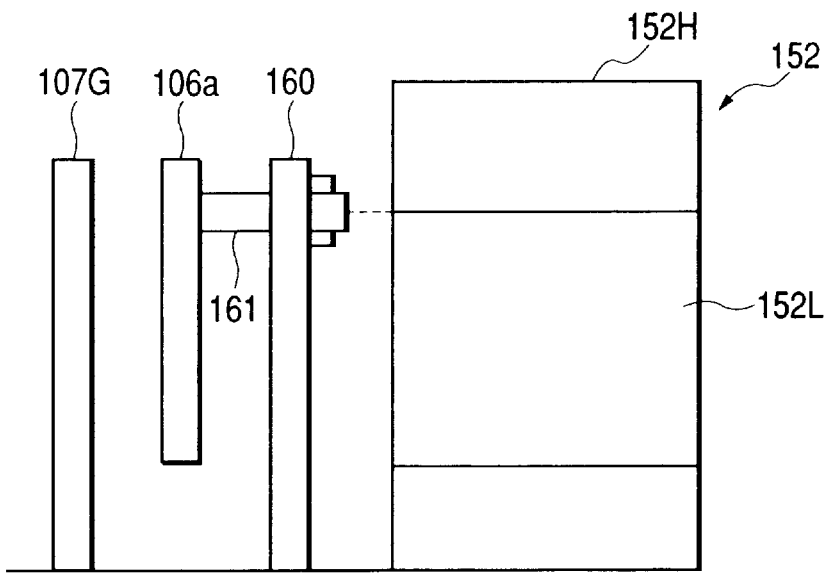
FIG. 19 is a side view for describing the installation of a ¼ wavelength plate.

Next, the alignment mechanism of the ¼ wavelength plate is described while referring to FIG. 19.

FIG. 19 is a side view for describing the installation of the ¼ wavelength plate. In the figure, the reference numeral 160 is for example an installation plate for the ¼ wavelength plate of FIG. 8, and is installed with a window for allowing light to permeate from the polarized beam splitter 152. The ¼ wavelength plate 106b is clamped to the shaft 161. The shaft 161 is installed to allow rotation in the installation plate 160, and aligned so the light on the polarized optical axis matches the liquid crystal display element 107G, and is clamped after alignment to the installation plate 160. The center of the rotation axis of the ¼ wavelength plate 106b is positioned to match the upper edge of the prism 152L. In other words, the ¼ wavelength plate 106b is a reference for the upper edge or lower edge or output side or left/right sides of the polarized beam splitter 152. Accordingly, the reference is also fixed during replacement of the liquid crystal element, the alignment procedure is simple to perform since the original position is clear. Needless to say, the above example can also be applied to installation of the ¼ wavelength plate.

The polarized beam splitters 105RG, 105RB, 105RGB in FIG. 8 and FIG. 9 have a surface that does not contribute to the permeance or reflection of light, however this surface is intended to prevent random reflections from these surfaces. The surface not used for permeance or reflection of light is preferably made of non-transparent glass or painted black. The same is in effect for substituting the polarized beam splitter with a dichroic prism.

The B light input to the color combining polarized beam splitter 105RGB is S polarized light as per FIG. 8, the RG light is P polarized light, and the optical axis of light output from the B light liquid crystal display element 107B and optical axis of light output from the color combining polarized beam splitter 105RGB are installed so as to intersect one another. A dichroic mirror or dichroic prism may be utilized instead of the color combining polarized beam splitter 105RGB.

When using a dichroic mirror or dichroic prism instead of the color combining polarized beam splitter 105RGB shown in FIG. 8, the S polarized light has good efficiency as light combined with other light to serve as reflected light in the color combining dichroic mirror or dichroic prism, and conversely P polarized light has good efficiency as combined light to serve as permeant light. In other words, when the reflected light is S polarized light, the reflectance band width of the dielectric film formed on the dichroic mirror or dichroic prism is wide, and there is little susceptibility to effects such as wavelength shift due to characteristics of the film. Further, when the permeant light is P polarized light, the permeance band width of the dielectric film formed on the dichroic mirror or dichroic prism is wide, and there is little susceptibility to effects such as wavelength shift due to characteristics of the film. Accordingly, the efficiency is good in a structure in which the B light is P polarized reflective light, the RG light permeating the dichroic mirror or dichroic prism combines as P polarized light and is reflected by means of the dichroic mirror or dichroic prism and output along the optical axis.

When utilizing the color combining polarized beam splitter 105RGB on the other hand, the light from the B light liquid crystal display element 107B is reflected by the color combining polarized beam splitter 105RGB, and when configured to combine with the RG light and be output, the reflected light is of course made into S polarized light and the permeating light must be made into P polarized light.

In FIG. 9, the G light input to the color combining means consisting of the color combining polarized beam splitter 105RGB is S polarized light, the RB light is P polarized light, and further the optical axis for light output from the polarized beam splitter 105RGB constituting the output means is installed so as to be in parallel with the light output from the G light liquid crystal display element 107G.

Referring to FIG. 9 shows a structure in which the R light liquid crystal display element 107R and the B light liquid crystal display element 107B are installed at right angles, and the input light axis and the output light axis of the color separating polarized beam splitter 105RB for separating the R light and the B light are at approximate right angles, and the projection lens 113 is installed to be approximately in parallel with this output light axis.

Needless to say, in this embodiment, the dichroic mirror and the dichroic prism can be utilized instead of the color separating polarized beam splitter 105RB.

An image display device as shown in FIG. 14 can be obtained by means of the structure shown for the optical unit of FIG. 8 and FIG. 9.

Figure 20:
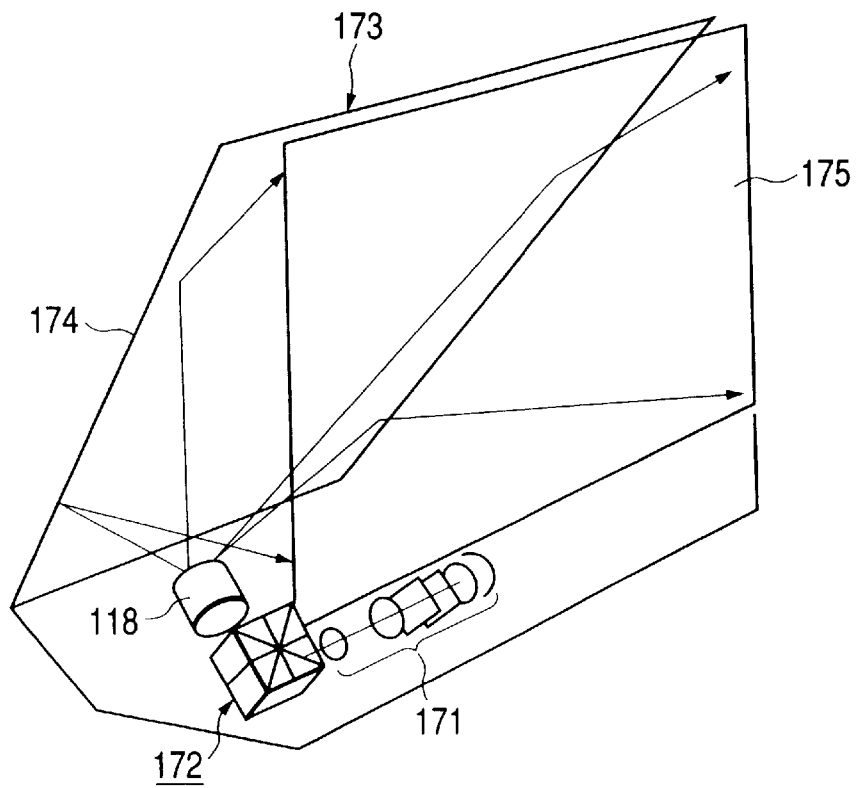
FIG. 20 is an overall perspective view showing an embodiment of the image display device of the invention.

FIG. 20 is an overall perspective view showing an embodiment of the image display device of the invention. This figure is shown as viewed as an optical system. In the figure, the reference numeral 171 is the optical system, reference numeral 172 is the optical unit as shown in FIG. 8 and FIG. 9, the optical axis of the light input to the separating unit 172 from the optical system 171 is bent at a right angle and output from the separating/combining unit 172. This light is reflected by the reflecting mirror 172 installed on the rear side of the cabinet and projected onto the screen 175 by way of the projecting lens 118. In this case, the optical axis of the separating/combining unit 172 and the projection lens 118 may be shifted and the input angle changed to the reflecting mirror 172 on the rear side of the cabinet.

The above structure allows the mirror size to be reduced and the size of the set depth wise to be reduced. In this case, the optical axis of the color combination prism and analyzing light prism may be shifted. Further, the optical axis of the projection lens 118 and the optical axis of the color combining prism may be shifted in steps.

Figure 21:
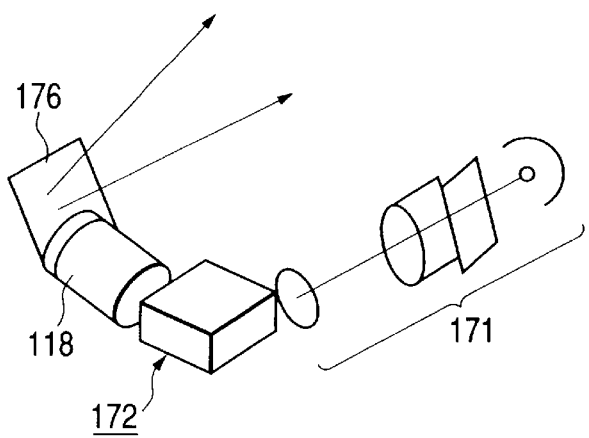
FIG. 21 is a perspective view showing another embodiment of an optical system.

FIG. 21 is a perspective view showing another embodiment of the optical system. This figure differs from the embodiment of FIG. 14 in that a mirror 176 is installed for converting the optical axis. By installing the mirror 176 in this embodiment, the image can be directly projected onto the screen.

In the embodiments of FIG. 20 and FIG. 21, the optical system can be compactly installed.

In FIG. 8, the R light, B light and G light is input from the direct polarity converter element 101 to the reflective mirror 109, and the G light and B light permeated through the reflective mirror 109, and the B light reflected. This B light is reflected at the polarized beam splitter and input to the B light liquid crystal element. The light from the B light liquid crystal display element is input to the color combining polarized beam splitter 105RGB, permeated through it and output. The G light and R light on the other hand, is input to the respective R light and BG light liquid crystal elements. The light output from these light liquid crystal elements is reflected is reflected at the color combining polarized beam splitter 105RGB, and then output so that the optical axis for light input to the mirror 109 functioning as the color separating mirror is approximately in parallel with the optical axis for inputting light onto the projection lens from the color combining polarized beam splitter 105RGB. In this case, the fact that the polarized beam splitter can be substituted with the dichroic mirror and dichroic prism is readily apparent to one skilled in the related art.

Figure 22:
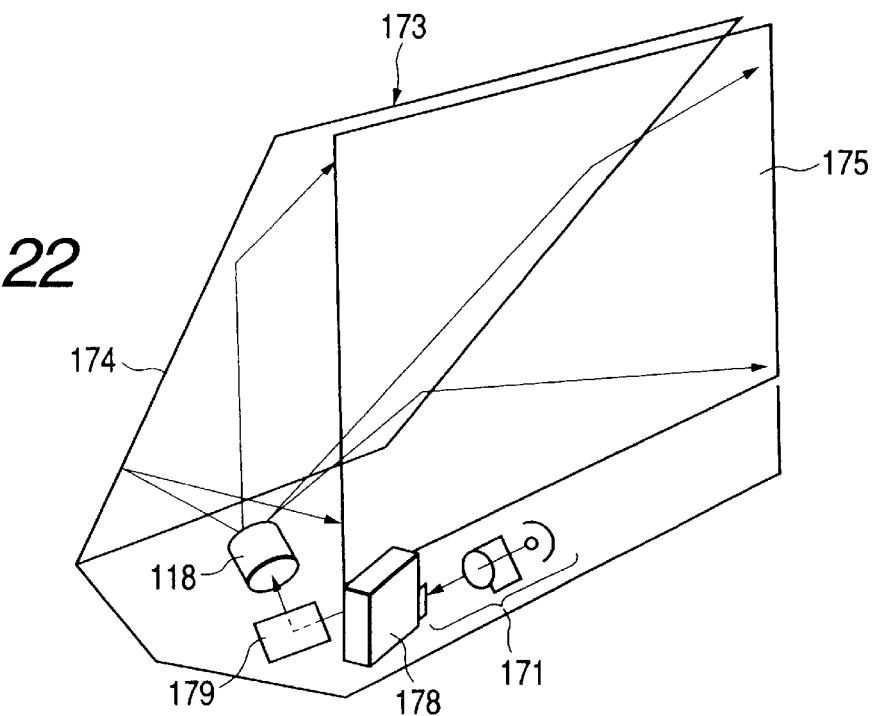
FIG. 22 is an overall perspective view showing another embodiment of the image display device of the invention.

An image display device utilizing the above described optical unit is next described while referring to FIG. 22.

FIG. 22 is an overall perspective view showing another embodiment of the image display device of the invention. In the figure, the input axis for light input to the optical unit 178 from the optical system 171 is approximately in parallel with the optical axis of light output from the optical unit 178. The light output from the optical unit 178 is reflected at the reflection mirror 179 and input to the projection lens 118, and reflected at the reflection mirror 174 installed at the rear side of the cabinet 173 and projected onto the screen 175.

The back-focus of the projection lens can be shortened in this embodiment so that the number of projection lenses can be reduced and the structure made more compact.

Figure 23:
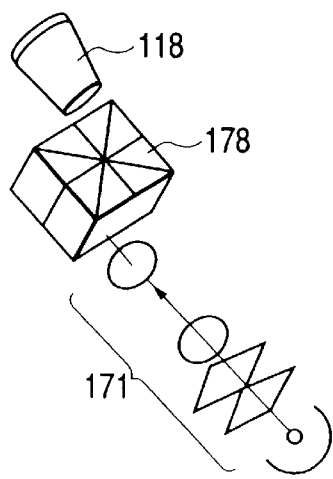
FIG. 23 is a perspective view showing still another embodiment of the optical system.

FIG. 23 is a perspective view showing still another embodiment of the optical system. The figure shows a component placement not utilizing the reflection mirror 179. Compared to the embodiment of FIG. 22, the image display device is somewhat longer vertically but can be shortened horizontally.

In FIG. 20 and FIG. 21, when the light output from the projection lens is projected onto the screen 175 by means of the reflective mirror 174 installed on the rear side of the cabinet 173, the lens, is for example a full panel lens integrated with the screen 175 and can be installed to project the light approximately in parallel and achieve a compact set structure.

In FIG. 1, the condenser lens 30 installed upstream of the liquid crystal display elements 2R, 2G, and 2B can be integrated with the projection lens 20 and when configured so that a first composite focus point position is present in the vicinity of the aperture of the projection lens 20, the light ray passing through the polarized beam splitters 16G, 16RB and color combining mirror 19 can be focused so that these components can be a compact structure. In particular, when utilizing a color combining polarized beam splitter or dichroic prism instead of the color combining mirror 19, the prism becomes lighter and a lower cost can be obtained.

In FIG. 8 and FIG. 9, when a dichroic prism or dichroic mirror is utilized instead of the color separating mirror 102, and a dichroic prism or dichroic mirror is utilized instead of the polarized beam splitter 105RGB, unnecessary light can be eliminated and color purity can be improved by setting the half wavelength of the color separating dichroic prism or dichroic mirror to a different value to the half wavelength of the color combining dichroic prism or dichroic mirror. For example, when the input dichroic characteristics, or in other words when the reduced half wavelength of the bandpass filter is specified as 500 nm, the high region half wavelength is specified as 590 nm, the reduced half wavelength for dichroic characteristics of the output prism is specified as 510 nm, and a high region half wavelength of 580 nm is specified, then the cyan between 500 nm and 510 nm, and the yellow light between 580 nm and 590 nm can be eliminated. This combination can also be achieved with a dichroic mirror and designated wavelength converter element. This combination is also possible with a designated wavelength converter element and polarized beam splitter. A combination cutting light in the near ultraviolet or near infrared region light is also possible.

In the embodiments of FIG. 8 and FIG. 9, when a cooling path is installed between the polarized beam splitter 105RG or 105RB and polarized beam splitter 105RGB, cooling efficiency is satisfactory because the designated wavelength converter element 112 and polarizing plate can be directly cooled.

The designated wavelength converter element 112 and polarizing plate 103 can be directly cooled by installing a blow vent for a cooling medium on the light input surface of the polarized beam splitter 105RG or polarized beam splitter RB and polarized beam splitter 105RGB or between the polarized beam splitter 105RG or polarized beam splitter RB and polarized beam splitter 105RGB.

Cooling efficiency be even further improved by installing input/output vents on the light input surface of the polarized beam splitter 105RG or polarized beam splitter RB and polarized beam splitter 105RGB or between the polarized beam splitter 105RG or polarized beam splitter RB and polarized beam splitter 105RGB, and by increasing the coolant medium flow rate.

The polarizing plate 103 can be directly cooled, highly efficient cooling medium achieved and performance improved by directly cooling the polarizing plate 103 installed at the light input surface of the polarized beam splitter 105RG or polarized beam splitter RB and polarized beam splitter 105RGB or between the polarized beam splitter 105RG or polarized beam splitter RB and polarized beam splitter 105RGB.

The invention along with having a compact and lightweight structure, also allows freely controlling the color purity, and improving color irregularities and simultaneously improves performance. By further combining a polarized beam splitter and designated wavelength converter element as a color separating means, the effects due to angle dependency are slight and planning the color performance is easily accomplished.

A compact, high brightness, high image quality optical unit or projection type image display device can therefore be achieved. A low cost is further achieved since the number of parts can be reduced.

Figure 24:
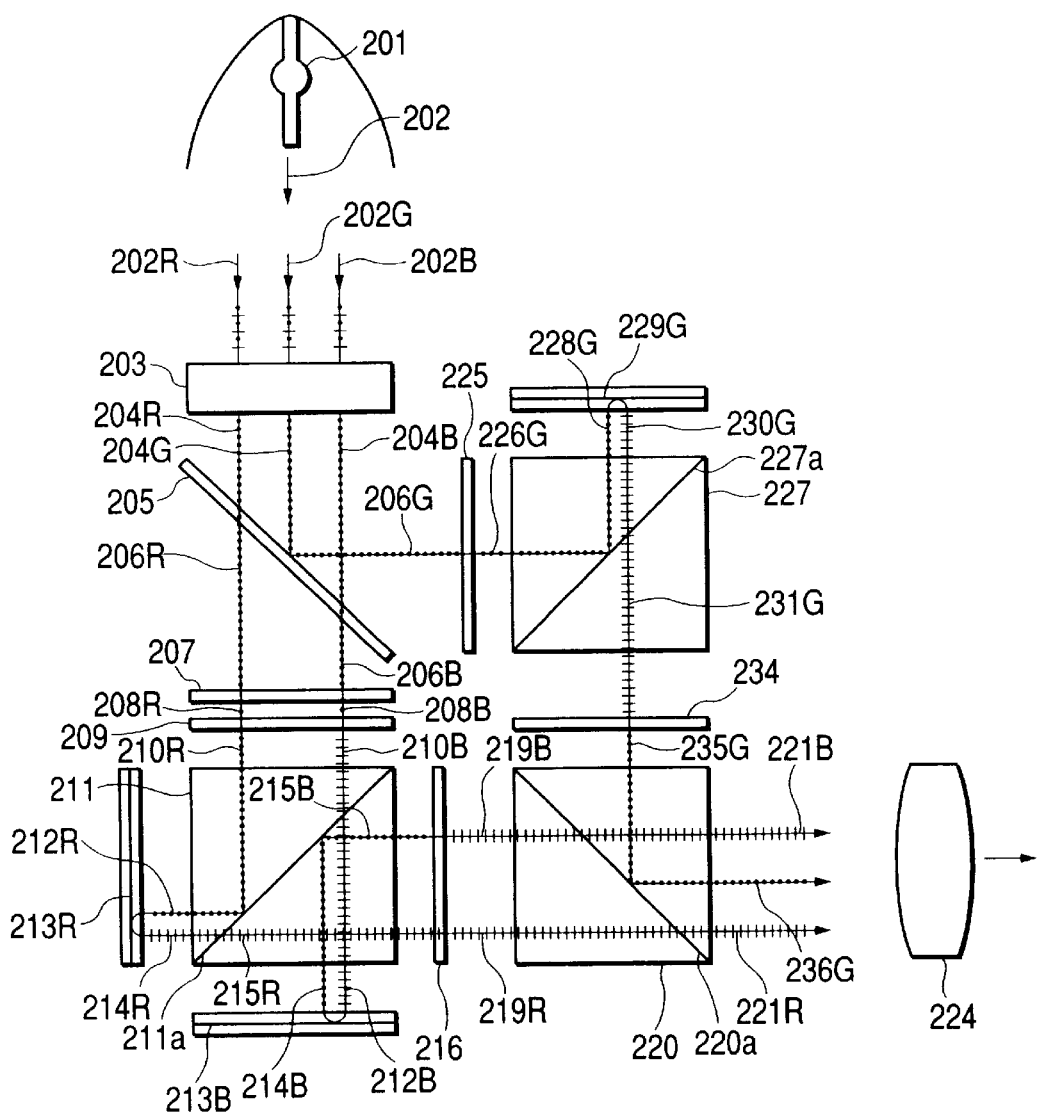
FIG. 24 is an overall plan view showing a sixteenth embodiment of the projection type liquid crystal image display device of the invention.

FIG. 24 is an upper concept view of another embodiment of the liquid crystal projector optical system of the invention.

Figure 25:
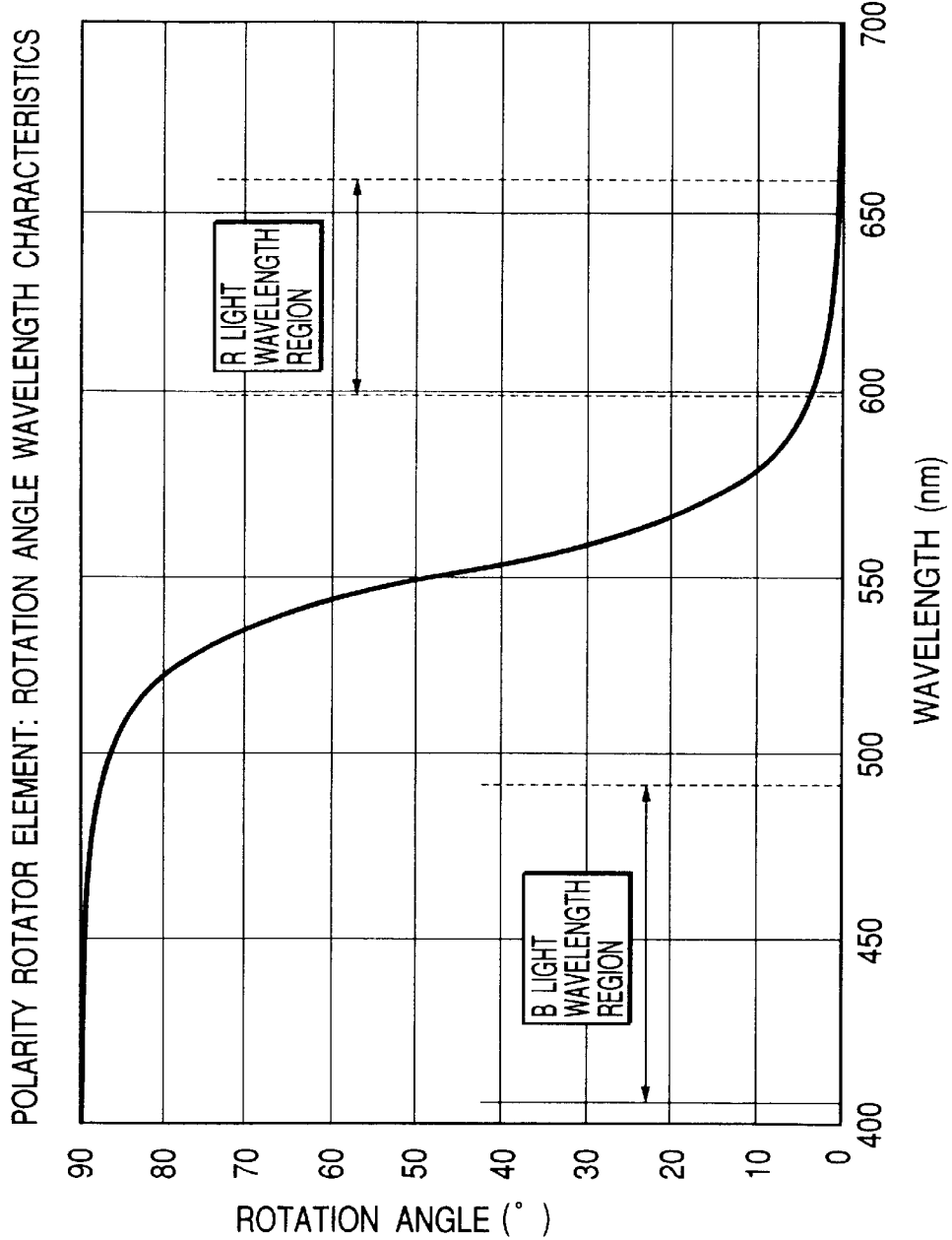
FIG. 25 is an overall plan view showing a seventeenth embodiment of the projection type liquid crystal image display device of the invention.

A graph of rotation characteristics of polarized light of the polarized rotator elements 219 and 261 for only the B light wavelength is used in the embodiment in FIG. 25. The horizontal axis on the graph shows the light wavelength, and the vertical axis shows the polarized light rotation angle. As shown in FIG. 25, the polarized rotator elements in this embodiment have an intermediate point for rotating the polarized light to a position with a wavelength of approximately 550 nm.

Another embodiment of the invention is described in detail utilizing FIG. 24.

the white colored light radiated from the light source 201 is converted by the reflector to an approximately parallel light beam 202. The parallel light beam 202 is comprised of R light components 202R, G light components 202G and B light components 202B. The parallel light beam 202 is converted to S polarized light by the polarity converter element 203 and becomes S polarized R light 204R, S polarized G light 204G, and S polarized G light 204B.

The S polarized R light 204R and S polarized B light 204B input to the reflecting RB dichroic mirror 205 and after permeating through the surface of the dichroic mirror, permeates the polarizing plate 207 and P polarity light components are absorbed, and the light becomes S polarized R light 208R and S polarized B light 208B. The reason for installing the polarizing plate 207 at this position is because rectification of polarized light by the polarity converter element 203 is insufficient, and the image contrast suffers deterioration due to some P polarized light contained in the 204R, 204G and 204B input light. A high contrast can be obtained by absorbing the P polarized light using the polarizing plate 207.

The S polarized R light 208R and S polarized B light 208B are input to the polarity rotator element 209 for rotating the polarized B light, the S polarized R light is not converted and becomes S polarized R light 210R, the S polarized B light is rotated and becomes P polarized B light 210B. The S polarized R light 210R input to the polarized beam splitter prism 211 is reflected by the surface of the splitter 211a, becomes S polarized R light 212R, and is input to the reflecting liquid crystal display element 213R. Here, the light to brighten the display by the liquid crystal display element 213R is reflected as P polarized R light 214R, and is reflected unchanged as S polarized R light to darken the display. The light when darkening the display is omitted along with R, G, and B in FIG. 24. The P polarized R light 214R is input again to the polarized beam splitter prism 211, and this time permeates the splitter surface 211a as P polarized light and becomes P polarized R light 215R.

The P polarized B light 210B on the other hand, permeating the polarity rotator element 209 for rotating the polarized B light, is input to the polarized beam splitter prism 211, permeate the splitter surface 211a and becomes S polarized B light 212, and is input to the reflecting liquid crystal display element 213B. Here, the light to brighten the display by the liquid crystal display element 213B is reflected as S polarized B light 214B, and the light to darken the display is reflected unchanged as P polarized B light. The light to brighten the display is S polarized B light 214B and is input again to the polarized beam splitter 211, and this time is S polarized light so that it is reflected by the splitter surface 211a, and becomes S polarized B light 215B, and combined with the P polarized R light 215R.

The P polarized R light 215R and S polarized B light 215B is input to the polarity rotator element 216 for rotating the polarized B light, the P polarized R light 215R becomes P polarized R light 219R without being changed. The S polarized B light 215B is rotated and becomes P polarized B light 219B. Both of the P polarized R and B light that became P polarized R light 219R and P polarized B light 219B are input to the polarized beam splitter 220, and permeate the splitter surface 220a, and become P polarized R light 221R and P polarized R light 221B. Also at this time, the S polarized R and B light for darkening the display is reflected so that the contrast is further improved in the R and B light.

The light 2G output from the light source 201 is converted to S polarized G light 204G by the polarized converter element 203 and then reflected by the G-reflecting RB dichroic mirror 205, input to the polarizing plate 225, the P polarized light components are nearly completely cut out, the light becomes S polarized G light 226B and is input to the polarized beam splitter 227. The S polarized G light 226B is reflected in the polarized beam splitter surface 227a and become S polarized G light 228G and is input to the G-reflecting liquid crystal display element 229G. Here, the P polarized G light to brighten the display is reflected as P polarized G light 230G and again input to the polarized beam splitter 227, this time as P polarized light so that it permeates the splitter surface 227a and becomes P polarized G light 231G. The P polarized G light 231G is input here to the polarity rotator element 234, the polarized light rotated and becomes S polarized G light 235G.

The S polarized G light 235G is here input to the polarized beam splitter 220 and is reflected by the splitter surface 22a and become S polarized G light 236G, and is combined with the P polarized R light 221R and S polarized B light 221B. The combined image light here has P polarized R and B light components, and S polarized G components, and is projected, enlarged onto the projection lens 224.

In this embodiment, the upper and lower surfaces of each prism are painted a black color, serving to reduce internal reflections in the polarized beam splitter or dichroic mirror prism and allows a high contrast to be obtained.

In this embodiment, in regards to image contrast characteristics, the G image light 231G reflected by the G-reflecting liquid crystal display element 229G is sufficiently reflected by the splitter surface 227a of the polarized beam splitter 127 as light for darkening the display and so has high contrast. The R image light for darkening the display is reflected at the splitter surfaces 211a, 220a of the polarized beam splitter prisms 211, 220, and good contrast can be obtained. A high contrast can be obtained per the B image light from the splitter surface 220a of the polarized beam splitter prisms 220.

In this embodiment, even with characteristics such as shown in FIG. 25 for the polarity rotator elements 209, 216 for rotating the polarized B light, the permeating B light and R light does not include light wavelengths for angle rotation in an excess region so there is little elliptical polarized light after permeation, and after permeating the polarizing plate 218, a high contrast can be obtained. By further utilizing the polarity rotator element 216 for improving the image contrast, there is no need to cut out light between the R and G light, and G and B light, so that light utilization efficiency is high.

Also in this embodiment, the distance from the polarity converter element 203 to the reflective liquid crystal display elements 213R, 229G, 213B can be made nearly equal so that the image has few irregularities. Also the distance from the polarity converter element 203 to the reflecting liquid crystal display elements, and the distance from the reflecting liquid crystal display elements to the projection lens 224 can be increased 2.5 times in length along the sides of all the liquid crystal display elements, and the shortening of the projection lens back-focus, an optical system that is compact and light-weight can be achieved while simultaneously improving the light utilization efficiency.

Figure 26:
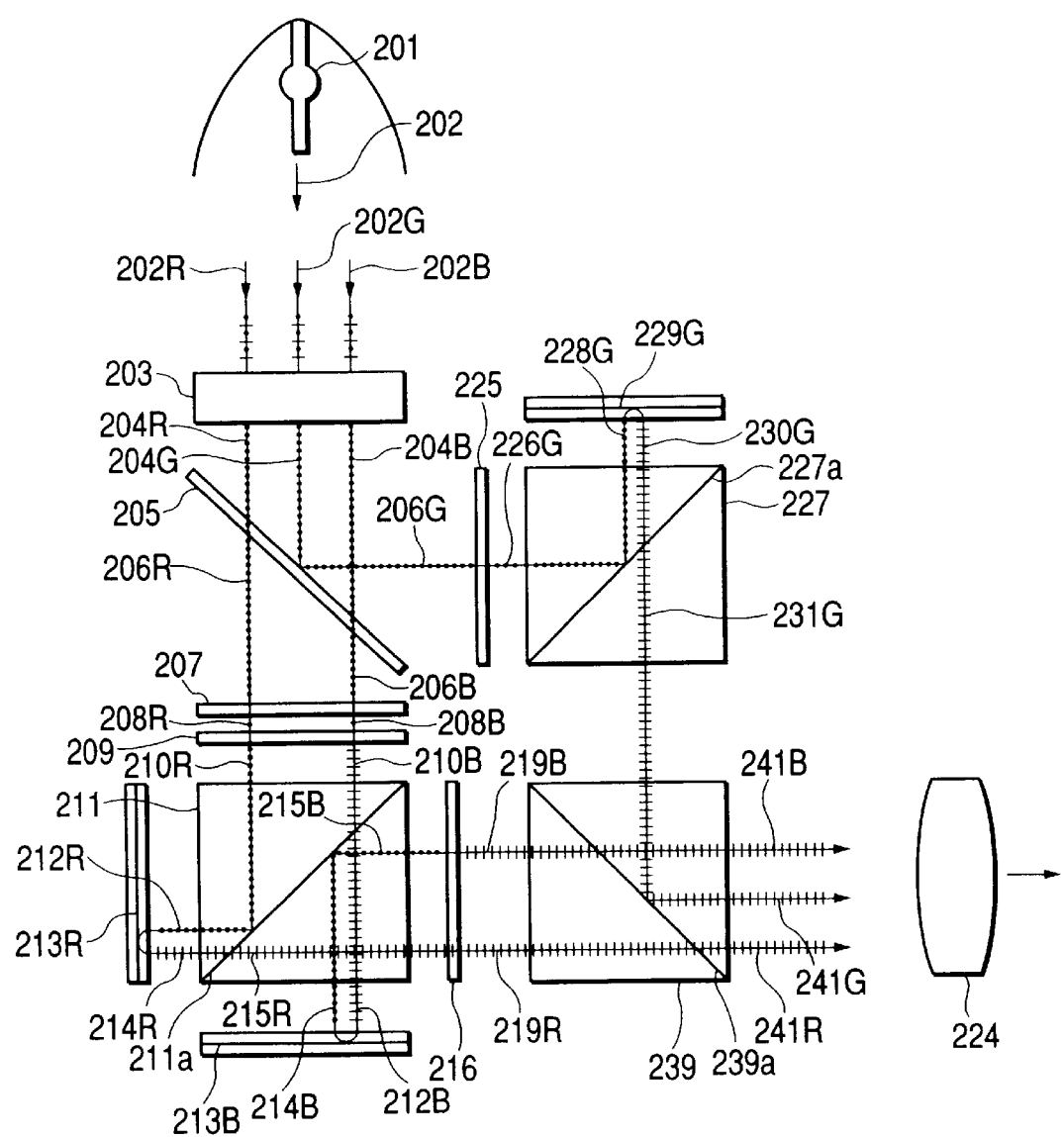
FIG. 26 is an overall plan view showing an eighteenth embodiment of the projection type liquid crystal image display device of the invention.

FIG. 26 is an overall upper view showing another embodiment of the liquid crystal projection optical system of the invention. In this embodiment, in contrast to the above described embodiment, the polarity converter element 216 on the optical path of the R and B image light is removed, and the polarized beam splitter 220 is replaced with a dichroic mirror prism 239. The dichroic mirror surface 239a of the dichroic mirror prism 239 is a multilayer thin film having properties to reflect the G light wavelength and allow permeation of light on R and B wavelengths.

The processing of the R light and B light of the optical system in this embodiment is the same as the previous embodiment from the output from polarized beam splitter 211.

The P polarized R light 215R and S polarized B light 215B combined in the polarized beam splitter 211 are input to the polarity rotation element 216 for rotating the polarized B light, the P polarized R light 215R becomes P polarized R light 219R without being changed. The light polarity of the S polarized B light 215B is rotated and it becomes P polarized B light 219B. The P polarized R light 219R and the P polarized B light 219B are input to the dichroic prism 239, permeate the dichotic surface 239a, and become P polarized R light 241R and P polarized B light 241B. Also at this time, the S polarized light is reflected for darkening both the B and R light display so that the contrast of both the R and B light is improved.

The processing of the G image light 231G is the same as in the first embodiment from output from the polarized beam splitter 227 and afterwards is input to the dichroic mirror prism 239.

The P polarized G image light 231G input to the dichroic mirror prism 239 is reflected by the dichroic mirror surface 239a and becomes P polarized G light 241G, and is combined with the P polarized R light 241R and P polarized B light. The combined image light holds P polarized light components for both R, G and B and is projected as an enlarged image onto the screen by the projection lens 224.

In this embodiment, besides obtaining the same effect as the other embodiments, the polarity rotator element 234 can be eliminated and a more simple structure obtained.

In this embodiment, the same effect can be achieved by replacing the dichroic mirror prism 39 with a dichroic mirror. Also, a dichroic film such as a sloping film can be freely set in the dichroic mirror 5, and combining dichroic mirror prism or dichroic mirror so that an image with high uniform color purity can be obtained.

Figure 27:
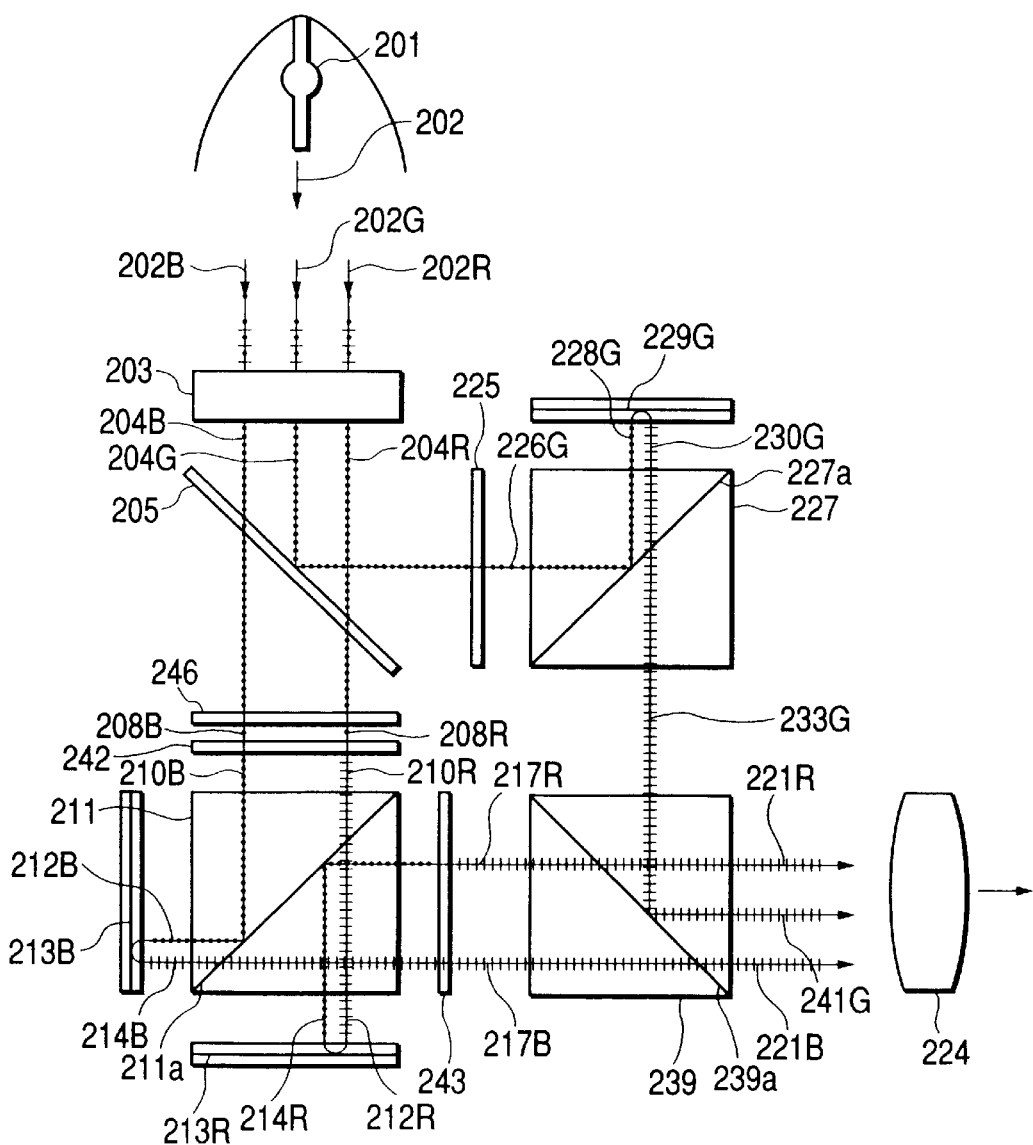
FIG. 27 is an overall plan view showing a nineteenth embodiment of the projection type liquid crystal image display device of the invention.

FIG. 27 is an overall plan view showing a nineteenth embodiment of the liquid crystal projector optical system of the invention.

Compared to the embodiment of FIG. 26 of this invention, in this embodiment the positions of the R and B liquid crystal display elements 213R, 213B are interchanged, and the polarizing plate 207 for the R and B light input surface is changed to a polarizing plate 246 for B light only, and the polarity rotator elements 209, 216 for rotating the polarity of the B light, are changed to polarity rotator elements 242, 243 for rotating the polarity of the R light.

Figure 28:
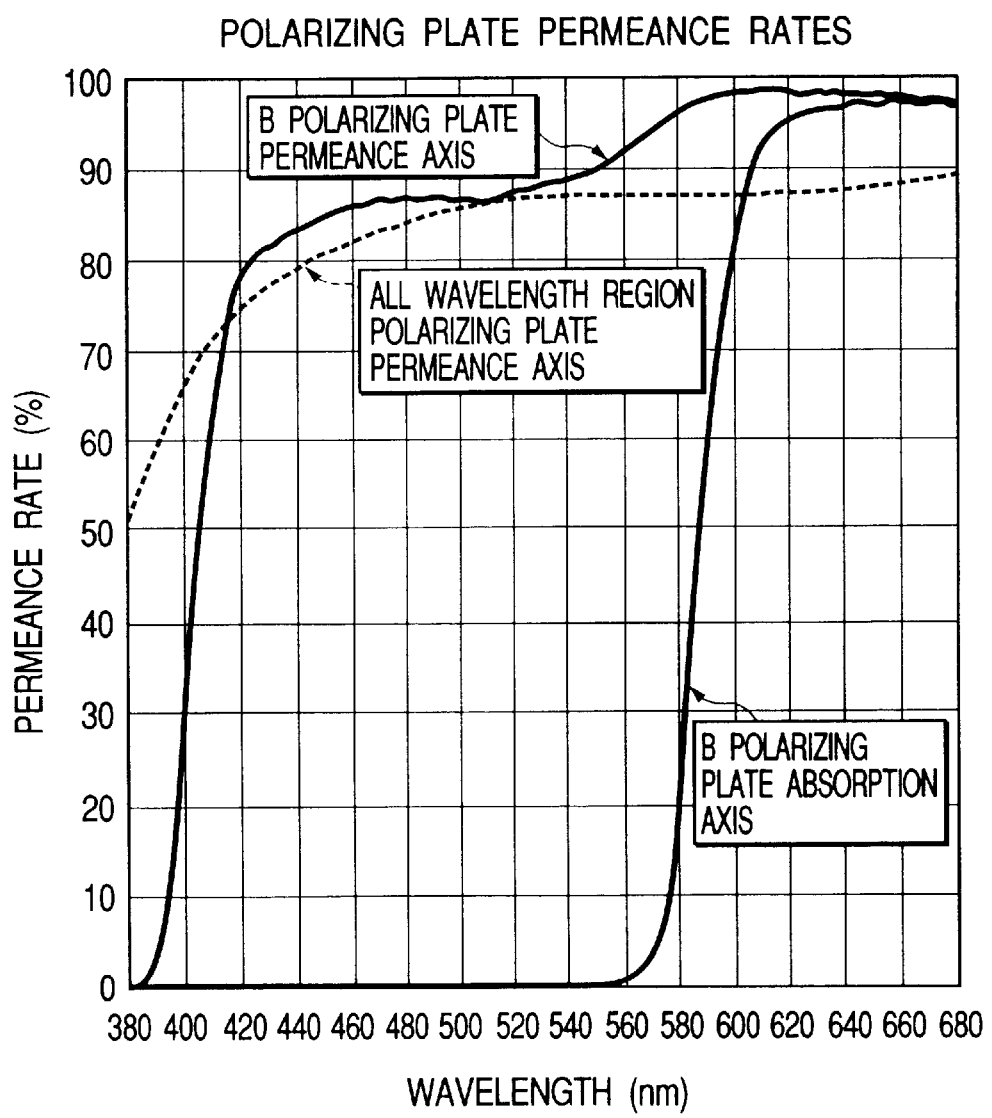
FIG. 28 is an overall plan view showing a twentieth embodiment of the projection type liquid crystal image display device of the invention.

FIG. 28 is a graph showing the wavelength permeance characteristics of the polarizing plate for all wavelengths and the wavelength permeance characteristics of the polarizing plate only for the B wavelength used in the embodiment of the invention. The B light polarizing plate used in this embodiment as shown in FIG. 28 functions on B light wavelengths but allows R light to permeate through on both the absorption axis and permeance axis and does not function as a polarizing plate.

The effect of the optical system of this embodiment on the R light and B light is the same as the embodiment of FIG. 27 prior to light input to the B only polarizing plate 246 and after light was input to the dichroic prism 239.

The S polarized B light 204B that permeated the G-reflecting dichroic mirror 205 has its P polarized components absorbed by the B light polarizing plate 246 and becomes S polarized B light 208B. The S polarized B light 208B permeates through the polarity rotator element 242 used for rotating the deflection of the R light, and becomes S polarized B light 210B, and is input to the polarized beam splitter prism 211. The S polarized B light 210B reflected by the splitter surface 211a of the polarized beam splitter 211 becomes S polarized B light 212B, and is input to the B-reflecting liquid crystal display element 213B. When the B light reflected by the liquid crystal display element 213B is for brightening the display, the light becomes P polarized B light 214B, and is once again input to the polarized beam splitter 211. The P polarized B light 214B permeates the splitter surface 211a. In this case, the S polarized light to darken the display is reflected by the splitter surface 211a so that the B image light can have a high contrast. Here, the P polarized B light 214B permeates the polarity rotator element 42 for rotating the polarity of the R light, and becomes P polarized B light 217B and is input to the dichroic mirror prism 239.

The S polarized R light 204R that permeated the G-reflecting dichroic mirror 205, permeates the B light polarizing plate 246, and permeates the polarity rotator element 242 for rotating the polarity of the R light, and becomes P polarized R light 210R, and is input to the polarized beam splitter 211. The P polarized R light 21DR permeates through the splitter surface 211a but in this case the S polarized R light components are reflected by the splitter surface 211a, and the P polarized R light 212R having almost no S polarized components, and is input to the R liquid crystal display element 213B. When the R image light reflected by the R-reflecting liquid crystal display element 213 is brightening the display, it becomes S polarized light 214R, and is once again input to the polarized beam splitter 211. The S polarized light 214R reflected by the splitter surface 211a is input to the polarity rotator element 243 use for rotating the polarity of the R light, and becomes the P polarized R light 217R, and is input to the dichroic mirror prism 239. In the R image light input to the dichroic prism 239, the S polarized light for darkening the display is reflected by the dichroic surface 239, and becomes a P polarized R light 221R having high contrast and is output to the dichroic prism 239.

The processing of the G light in the optical system of this embodiment is the nearly the same as the embodiment of FIG. 26.

This embodiment, along with obtaining the same effect as the embodiment of FIG. 26, can utilize the polarizing plate on the input of the R, B light incident side as a B only polarizing plate, and higher brightness therefore can be achieved.

Figure 29:
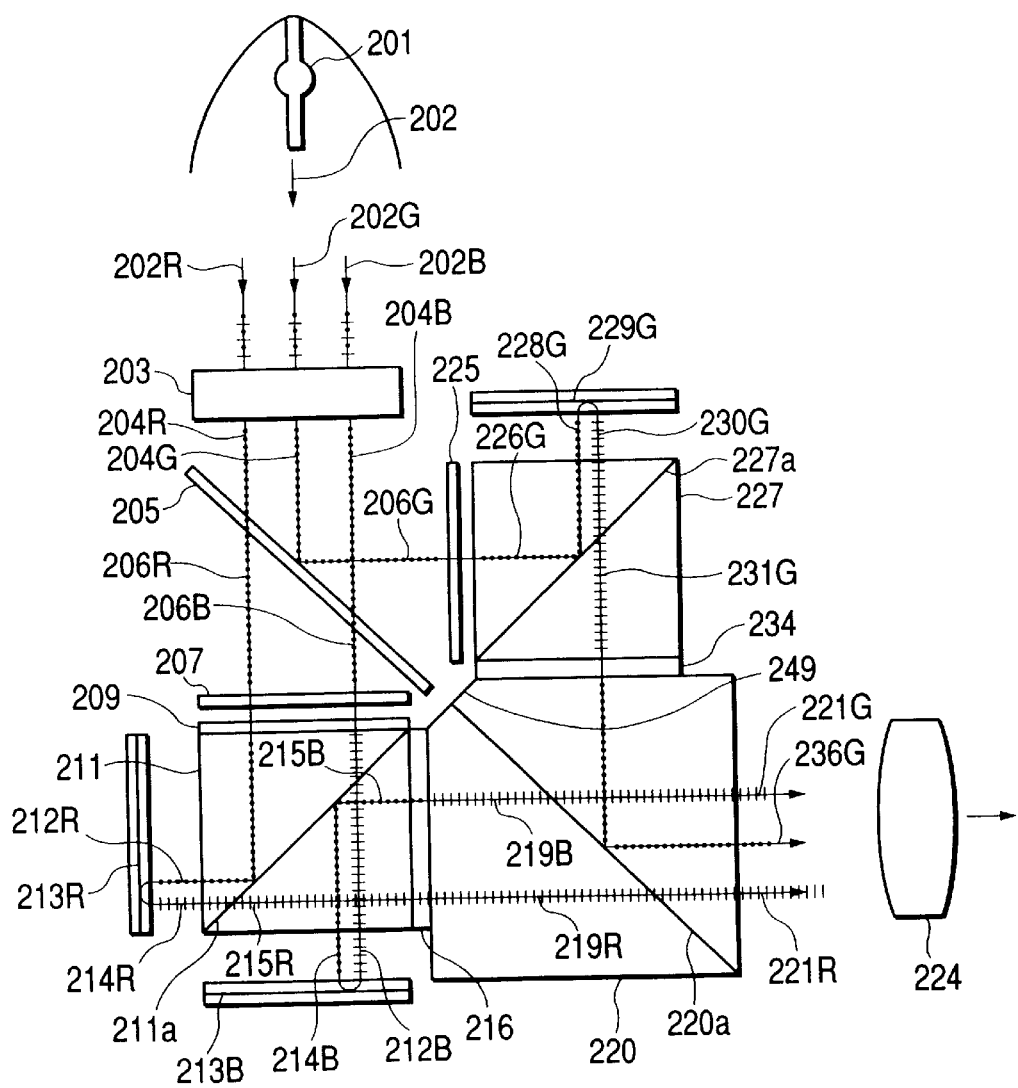
FIG. 29 is an overall plan view showing a twenty-first embodiment of the projection type liquid crystal image display device of the invention.

FIG. 29 is an overall plan view of the liquid crystal projector optical system of another embodiment of this invention.

The embodiment of FIG. 29, in contrast to the embodiment of FIG. 24 has a mutually aligned polarized beam splitter 211 and polarity rotator element 216 and polarized beam splitter prism 220 and polarity rotator element 234 and polarized beam splitter 227.

The processing of the R, G, B light in the optical system of this embodiment is the nearly the same as the embodiment of FIG. 24.

In this embodiment the size of the polarized beam splitters 211, 227 is smaller than the polarized beam splitter 220. The image light output from the reflecting liquid crystal display element will therefore not be eclipsed on the prism side and the overall structure of the optical system can be made more compact.

Also in this embodiment, an angle bevel 249 is installed in an optical element 220 such as a polarized beam splitter prism, and a support section installed here, or by installing a support section for an optical member such as the polarized plate 207, 225 or the dichroic mirror 205 the positioning and the holding of the optical member can be easily accomplished and the assembly time shortened during production and further, the overall cost for the projection type image display device can be reduced.

This embodiment, along with obtaining the same effect as the embodiment of FIG. 24, can achieve a compact structure for the overall optical system, shorten the assembly time during production and also reduce the overall cost for the projection type image display device.

Figure 30:
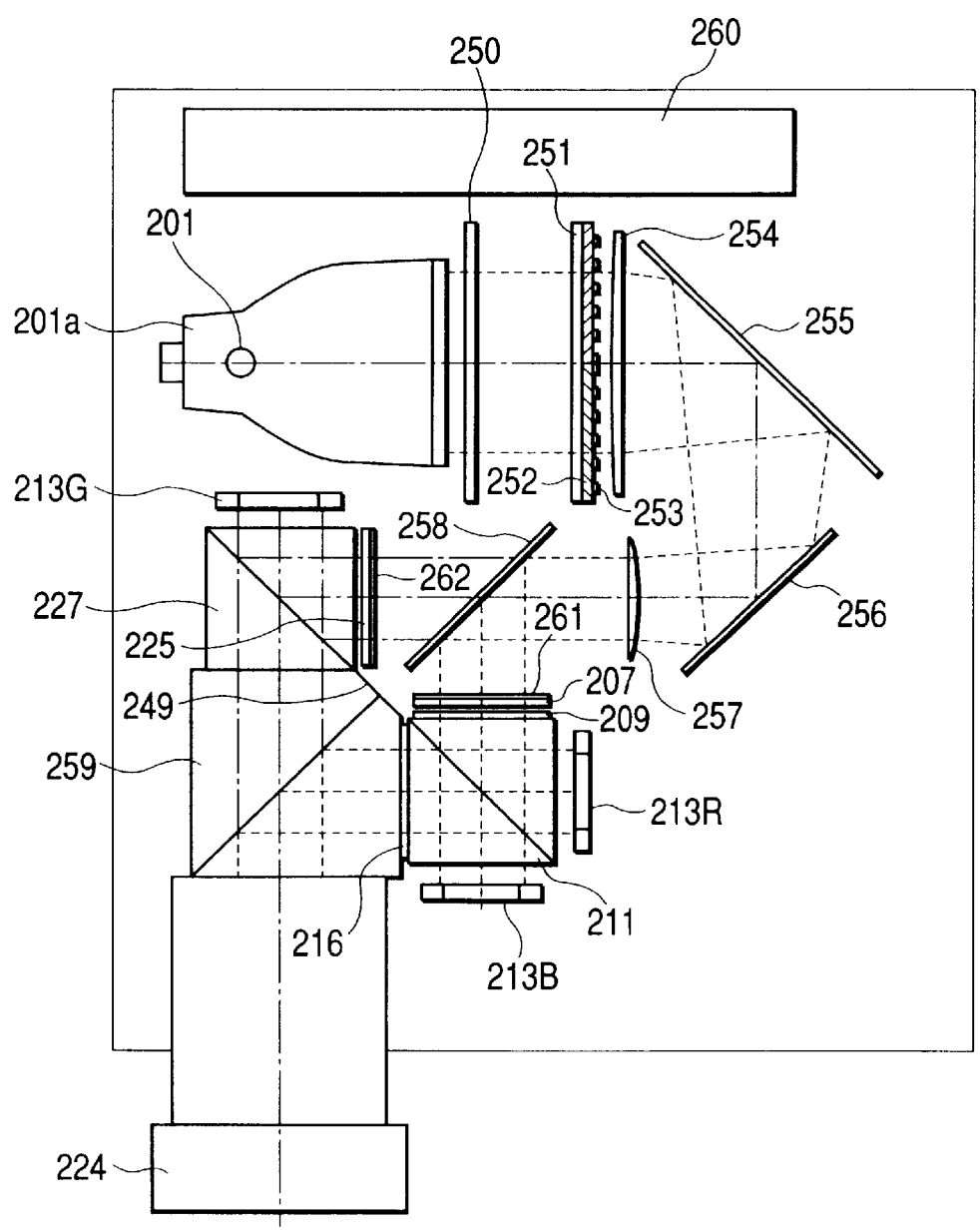
FIG. 30 is an overall plan view showing a twenty-second embodiment of the optical unit used in the image display device of the invention.

FIG. 30 is an overall plan view of the liquid crystal projector optical system of another embodiment of this invention.

The embodiment of FIG. 30 is a reflective three-plate liquid crystal projector device having liquid crystal display elements 2R, 2G, 2B corresponding to the three primary colors, R (red), G (green) and B (blue).

The fifth embodiment of the invention is hereafter described in detail while referring to FIG. 30.

The light source 201 is a white color lamp such as an ultra high voltage mercury lamp, metal halide lamp, xenon lamp, mercury xenon lamp or halogen lamp, etc.

The, light emitted from the lamp of the light source 201 is converted to an approximately parallel light beam by a reflector 1a having an elliptical surface, or a radial surface or a non-spherical surface, and input to a first array lens 250. The first array lens 250 is comprised by a plurality of condensing lenses installed in a rectangular frame having a size equivalent to the output beam aperture of this reflector 1a and the light concentrated to form a plurality of secondary light source images on the second array lens 251. The second array lens 251 has an external shape with a size equivalent to the first array lens and is comprised of the same number of focusing lenses, and is installed in the vicinity formed by the plurality of secondary light source images. The individual focusing lenses of the second array lens 251 have the effect of coalescing an image of the individual lenses of the first array lens 250 onto the liquid crystal display elements 213R, 229G, 213B.

The white-colored light that permeated the second array lens 251 is input to a row of diamond-shaped prisms of about half the size of each lens width installed for an appropriate pitch laterally along the optical axis of each lens of the second array lens 251. A polarized beam splitter 252 film is coated on the surface of these prisms and the input light is separated into P polarized light and S polarized light by the polarized beam splitter 252. The P polarized light proceeds directly through the interior of the polarized beam splitter 252 and its polarization direction is rotated 90 degrees by a polarity rotator element 253 installed on the output surface of this prism, becomes S polarized light and is output. The S polarized light on the other hand, is reflected by the polarized beam splitter 252, and after being reflected once more a long the basic direction of the optical axis within the adjoining diamond-shaped prism, is output as S polarized light.

The light is converted to light having S polarized light by the diamond-shaped prism and the polarity rotator element 253.

In the projection type image display device using the reflective liquid crystal display elements of the related art, the polarized light is reflected in only one direction of the S polarized light or P polarized light due to the combination of input light polarizing plate and reflective liquid crystal display elements, so that only about half the reflected light amount is obtained. However, by using the polarized beam splitter 252 and the polarity rotator element 253, a projection liquid crystal display device having twice the brightness of the device of the related art can theoretically be obtained by aligning along the direction of the random polarized light emitted from the light source 201 and inputting the light onto the reflective liquid crystal display element 213.

The first and second array lenses 250, 251 separate the light output from the reflector 201a in the first array lens, and by using the second array lens 251 to overlap the individual array images once again on the liquid crystal display element 213, a uniform image quality without variations in brightness can be obtained at the center and the sides of the screen.

The S polarized light components of the light output from the polarized beam splitter 252 are input to the condenser lens 254. The condenser lens 254 is comprised of one or a plurality of lenses, has a positive refractive potential, and has the effect of further concentrating the light. The light permeating through the condenser lens 254 is bent along the direction of its optical axis by the mirrors 255, 256, and input to the condenser lens 257. The condenser lens 257 sets the input angle for the polarized beam splitter of the chief ray input nearly perpendicular to the reflecting liquid crystal display element 213, and reduces irregularities caused by angular dependency of the polarized beam splitter prism.

The light is next input to the G permeating RB reflective dichroic mirror 258. In this embodiment, the G permeating RB reflective dichroic mirror 258 has the same effect as even a dichroic mirror prism. The light is here separated into two portions: G light and R, B light by the G permeating RB reflective dichroic mirror 258, and after permeating the respective polarizing plates 225, 207, is input to the angular polarized beam splitters 227, 211. The G light proceeds and is input to the G polarized beam splitter 227.

The input light at this time is S polarized light so is reflected by the reflecting surface of the polarized beam splitter, and input to the G reflecting liquid crystal display element 229G. The B light and R light permeates the polarizing plate 207 and then permeates the polarity rotator element 209 for rotating the polarization direction only of the B wavelength light, and is converted from S polarized light to P polarized light, and input to the R, B (exclusive) polarized beam splitter prism 211. Here, the B light proceeds through the R, B (exclusive) polarized beam splitter prism 211 and is input to the B reflecting liquid crystal display element 213B. The S polarized R light on the other hand stays unchanged, and after being reflected by the reflecting surface of the R, B (exclusive) polarized beam splitter prism 211, is input to the reflecting liquid crystal display element 213R.

The above description is of course only one example and the invention is not limited by this example. A configuration may be utilized wherein the positions of the R and B reflecting liquid crystal display elements 213R, 213B are interchanged. Alternatively, the positions of the R and B reflecting liquid crystal display elements 213R, 213B and the polarized beam splitter 211, and the G reflecting liquid crystal display element 29G and the polarized beam splitter 227 may be interchanged, etc. This embodiment obtains the same effects even when incorporating the above changes.

After input of the light, the polarized light is converted to rotated image light according the video signal for each reflecting liquid crystal display element color, and input once again to the polarized beam splitter 211, 227 for each color and the S polarized light reflected and the P polarized light allowed to permeate through.

A plurality of reflective liquid crystal display elements 213R, 239G, 213B are installed to correspond to the number of display pixels (for example, 1024 horizontal pixels and 768 vertical pixels for each of the three colors, etc.). The light polarization rotation angle of the pixels for the reflecting liquid crystal display elements changes according to an external drive signal, a light is reflected in a direction intersecting the polarization direction of the input light for brightening the screen, and the image light is output towards the projector lens 224 by the polarized beam splitters 211, 227. When darkening the display, the reflected light is in the same direction as the polarized light, and the light returns as is, along the light input path, to the light source side.

The RGB light constituting the image is afterwards recombined by a color combining mirror such as the G-permeating RB reflective dichroic mirror prism 259, and the light passed through a projection lens 224 such as a zoom lens and then arrives on the screen. The image formed by the reflective liquid crystal display elements 213R, 229G, 213B is shown as an enlarged projection image on the screen by the projection lens 224. The reflective liquid crystal display devices utilizing these three reflective liquid crystal display elements drives the lamp and the panel by means of a power supply 260.

Accordingly, the structure of this invention utilizing two units constituted by a G exclusive and a R-B exclusive polarized beam splitter, along with achieving a device with a compact and light-weight structure, also allows freely controlling the color purity, improves color irregularities and simultaneously improves performance. A projection type image display device, compact and with high brightness and high image quality can therefore be provided.

The projection type image display device of the invention has a structure wherein a dielectric multilayer film allows only a designated light wavelength from the input light to pass through, for input to the polarized beam splitter installed approximately upstream of the reflective liquid crystal display element in order to obtain a peak value permeance rate or reflection efficiency of that P polarized light, and peak value of permeance rate or reflection efficiency for that S polarized light that is input. A G exclusive beam splitter 227, for example, is coated with a dielectric multilayer film ideal for G light exclusively for a wavelength band in the vicinity from 500 nm to 600 nm can be utilized, and also two R-B exclusive polarized beam splitter 211 coated with a dielectric multilayer film ideal for R light and B light exclusively for the two wavelength bands in the vicinity from 400 nm to 500 nm and from the vicinity of 600 nm to 700 nm can be utilized wherein the dielectric multilayer film is easily formed, and the permeance rate and reflecting efficiency are even further improved compared to the related art. A reflective liquid crystal display device achieving both high accuracy color restoration and high luminance, along with high efficiency contrast can therefore be provided. By also adding an inclined (sloping) film to the dichroic film, an image of higher uniformity and high color purity can be provided.

Since the projection type image display device of the invention, has a structure wherein after separating the light into G light and R, B light, and wherein the polarizing plates 225, 207 are installed prior to input of light to the polarized beam splitter prisms 211, 227, the dichroic filters 261, 262 or a color filter can easily be installed to correct the color 103 purity of the G light and R light on the light input surface of the polarizing plate, and both high monochrome color purity and high light utilization efficiency can be achieved.

Figure 31:
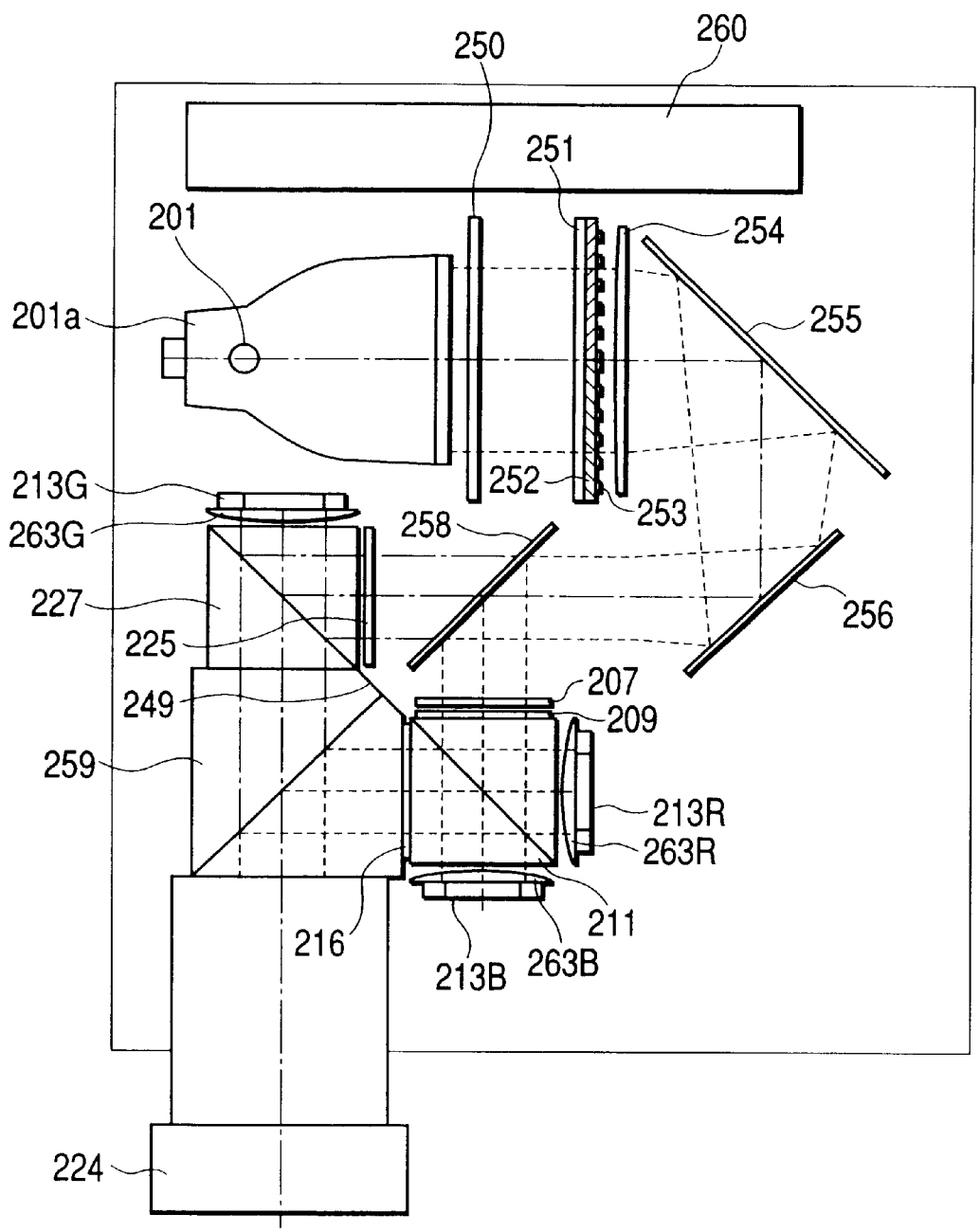
FIG. 31 is an overall plan view showing a twenty-third embodiment of the optical unit used in the image display device of the invention.

FIG. 31 is an overall plan view of the liquid crystal projector optical system of another embodiment of the invention. Compared to the embodiment of FIG. 30 having one condenser lens 256, this embodiment has three condenser lenses 263R, 263G, 263B, installed at positions between the reflective liquid crystal display element 213 and the polarized beam splitters 227 and 211. The dichroic thing film of the color separating dichroic mirror is an inclined (sloping) thin film.

In this embodiment, the reflective liquid crystal display elements 213 and the condenser lens 263 are integrated together, however if installed separately, or if the front and rear of the condenser lenses 263 are reversed and integrated with the polarized beam splitters 227 and 211 then the same effect can still be obtained.

The processing of the R, G, B light in the optical system of this embodiment is the nearly the same as the embodiment of FIG. 30. Also, by setting the condenser lens position just upstream of the reflective liquid crystal display elements, the internal surface reflection within the dichroic prism 259 and the polarized beam splitters 227 and 211 becomes slight, and a structure having high image quality and high contrast can be obtained.

Also in this embodiment, the angle of the chief ray input to the dichroic mirror for lighting the sides of the screen may sometimes not be parallel with the chief ray on the center of the screen, so that color variations are prone to occur on the left and right of the screen image however by making the dichroic film an inclined (sloping) film, an image with few color variations can be obtained.

Also in this embodiment, a first composite focus point of the condenser lens 263 is present in the vicinity of the constricting surface of the projection lens 224, and the center axis of the condenser lens 263 is aligned with the center of the reflective liquid crystal display element 213, and further, the center axis of the projection lens 224 is offset upwards to the panel center so the projected image is center-offset upwards to the projector, and therefore a satisfactory image having few brightness variations between the center and sides of the image can be obtained.

Figure 32:
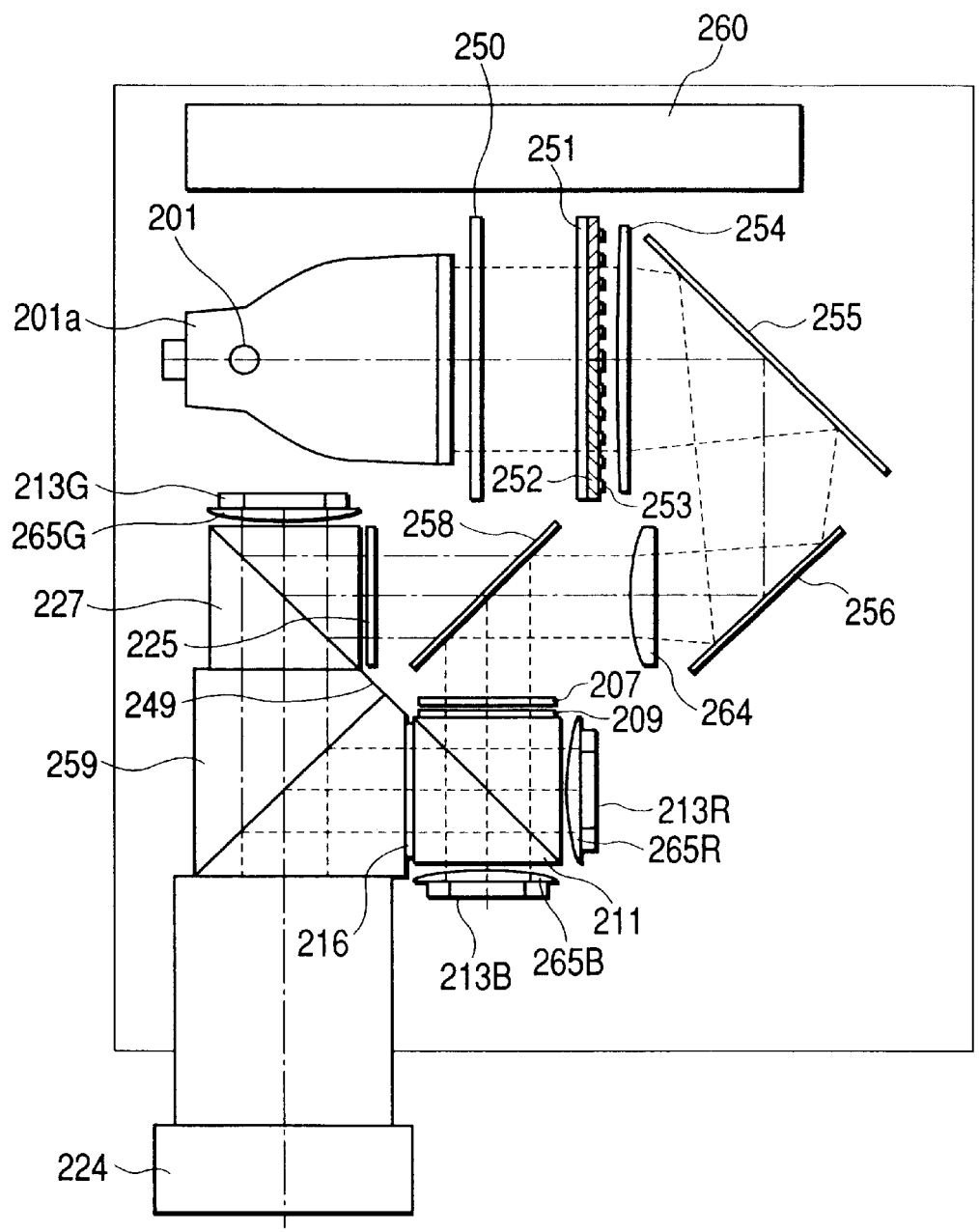
FIG. 32 is an overall plan view showing a twenty-fourth embodiment of the optical unit used in the image display device of the invention.

FIG. 32 is an overall plan view of the liquid crystal projector optical system of another embodiment of this invention. In contrast to the embodiment of FIG. 6, the embodiment of FIG. 32 is installed with a condenser lens 264 and further the focal distance combined for the condenser lens 265 and the condenser lens 264 is set nearly the same as the condenser lens 263 in the above embodiment.

The processing of the R, G, B light in the optical system of this embodiment is the nearly the same as the embodiment of FIG. 31. Also, by separating the condenser lens into two lenses, the effect can be obtained that a condenser lens 265 with smaller power can be designed, and deterioration in the image focus can be reduced. The angle of the chief ray permeating the polarized beam splitters 227 and 211 can be made even smaller so that the occurrence of color irregularities can be further reduced.

This invention can therefore be made compact and lightweight and performance can be improved.

What is claimed is:

1. An image display device having a plurality of reflective image display elements for forming an optical image according to a video signal from light output from a light source unit, and an optical system to beam the light onto the reflective image display elements and to combine and output the light reflected from the reflective image display elements, comprising:

a color separating unit for separating the light from the light source unit into a first and a second light;

a color separating/combining unit installed on an optical axis of the first light separated by the color separating unit;

a first reflecting unit;

a color combining unit for combining the optical image from the plurality of the reflective image display elements;

a second reflecting unit;

wherein the first light separated by the color separating unit is reflected by the first reflecting unit and input to the color separating/combining unit; and wherein the second light separated by the color separating unit is permeated through the color combining unit and input to the second reflecting unit for reflection, and the reflected second light is input to one of the reflective image display elements, and an optical image obtained from the one of the reflective image display elements is again reflected by the second reflecting unit and inputted to the color combining unit.

2. An image display device comprising:

a color separating unit to separate light into a first light and a second light and a third light;

a color separating/combining unit to separate and combine the first light and the second light;

first and second liquid crystal display elements installed at approximate right angles in a vicinity of the color separating/combining unit;

a third liquid crystal display element to input the third light; and a color combining unit to respectively combine the first, the second and the third light separated by the color separating unit;

wherein the first and second light separated by the color separating unit are respectively input to the first and second liquid crystal display elements, and the first light and the second light output from the first liquid crystal display element and the second liquid crystal display element, respectively, are combined in the color separating/combining unit, and the first light and second light combined in the color separating/combining unit are input to the color combining unit, and the third light separated by the color separating unit is input to the third liquid crystal display element through the color combining unit, and the light output from the third liquid crystal display element is input to the color combining unit, for combining with the first light and the second light.

3. An image display device according to claim 2, wherein a first reflecting unit is installed along the optical path from the color separating unit to the color separating/combining unit on the optical axis of the first and second light.

4. An image display device according to claim 3, wherein a second reflecting unit is installed along the optical path from the color separating unit to the third crystal display element on the optical axis of the third light.

5. An image display device according to claim 2, wherein a first designated wavelength converter element for converting the polarization direction of a first light is installed on the incident side of the color combining/separating unit, a second designated wavelength converter element for converting the polarization direction of a second light is installed at an output side of the color combining/separating unit, and a polarity converter element is installed on the optical path from the color separator unit to the third liquid crystal display element on the third optical axis.

6. An image display device according to claim 4, wherein the reflecting unit is comprised of any of aluminum, silver vapor deposition mirrors, full reflective prisms and mirror vapor deposition prisms, or is comprised of any of dichroic mirrors and dichroic prisms.

7. An image display device according to claim 2, wherein a first designated wavelength converter element for converting the polarization direction of a first light is installed on the incident side of the color combining/separating unit, a second designated wavelength converter element for converting the polarization direction of a second light is installed output side of the color combining/separating unit.

8. An image display device comprising:
a color separating unit for separating color in light, a first reflecting unit to change the optical axis of one light portion from the color separating unit at an approximate right angle;
a color separating/combining unit to separate a tight input by reflection from the first reflecting unit into a first light and a second light, to input the first light and the second light into a first and a second liquid crystal display element, respectively, installed in a vicinity of the color separating/combining unit, and to combine the first light and the second tight output from the first liquid crystal display element and second liquid crystal display element in the color separating/combining unit;
a color combining unit to be input with the first light and the second light from the color separating/combining unit; and
a second reflecting unit to reflect a third light separated by the color separating unit after permeation through the color combining unit, and input the third light to a third liquid crystal display element, wherein the light output from the third liquid crystal display element is inputted to the color combining unit to combine with the first light and second light.

9. An image display device according to claim 8, wherein a designated wavelength converter element is installed between the color separating unit and the color separating/combining unit.

10. An image display device according to claim 8, wherein a designated wavelength converter element is installed respectively between the color separating unit and the color separating/combining unit, and also between the color separating/combining unit and the color combining unit.

11. An image display device comprising:
a color separating unit for separating light having substantially a same polarization direction, a first reflecting unit to change an optical axis of a first light and a second light separated in the color separating unit at an approximate right angle;
a first designated wavelength converter element to convert the polarization direction of the first light which is reflected from the first reflecting unit and to permeate the second light therethrough without changing the polarization direction thereof;
a color separating/combining unit to separate the first light and the second light that permeated through the first designated wavelength converter element, to input the first and the second light to first and second liquid crystal display elements, respectively installed at approximate right angles to one another, to combine the first light and second light reflected from the first liquid crystal display element and second liquid crystal display element, respectively, and to emit a light output at an approximate right angle to the optical axis of the first and second light input thereto;
a second designated wavelength converter element to convert light from among the first and second light emitted from the color separating/combining unit to a first light polarization direction;
a color combining unit to be input with the first light and the second light from the second designated wavelength converter element;
a polarity converter element to convert the polarization direction of a third light separated by the color separating unit; and
a unit to input a third light from the polarity conversion element to permeate the color combining unit to a third liquid crystal display element wherein the third light reflected from the third liquid crystal display element is input to the color combining unit, and is combined with the first and second light and output.

12. An image display device according to claim 11, wherein a surface area of the section for the color separating/combining unit to output light is smaller than a surface area of the section for the color combining unit to be input with light.

13. An image display device comprising:
three reflective image display elements each provided for a red, a blue and a green color for forming optical images according to video signals from light output from a light source unit;
an optical system to beam light onto the reflective image display elements; and
a projection unit to project the light output from the reflective image display elements;
wherein a plurality of polarity separating/combining units for separating and/or combining the light based on the polarization of the light and a color separating/combining unit for separating and/or combining by reflecting or permeating light of a designated wavelength are combined on the optical axis of the reflective image display elements, and an optical axis output from the reflective image display for green color and an optical axis of the projection unit are made substantially in parallel, and the output light from the reflective image display is input to the projection unit permeating through two of polarity separating/combining units.

* * * * *